(12) United States Patent
Totsuka

(10) Patent No.: US 10,841,517 B2
(45) Date of Patent: Nov. 17, 2020

(54) SOLID-STATE IMAGING DEVICE AND IMAGING SYSTEM

(71) Applicant: CANON KABUSHIKI KAISHA, Tokyo (JP)

(72) Inventor: Hirofumi Totsuka, Fujisawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/142,815

(22) Filed: Sep. 26, 2018

(65) Prior Publication Data

US 2019/0104264 A1    Apr. 4, 2019

(30) Foreign Application Priority Data

Oct. 3, 2017    (JP) ................. 2017-193530

(51) Int. Cl.

| | |
|---|---|
| *H04N 5/378* | (2011.01) |
| *H04N 5/351* | (2011.01) |
| *G06T 7/55* | (2017.01) |
| *H04N 5/341* | (2011.01) |
| *H04N 5/357* | (2011.01) |

(Continued)

(52) U.S. Cl.
CPC ............ *H04N 5/351* (2013.01); *G06T 5/002* (2013.01); *G06T 5/50* (2013.01); *G06T 7/55* (2017.01); *H04N 5/341* (2013.01); *H04N 5/357* (2013.01); *H04N 5/378* (2013.01); *G06T 2207/10028* (2013.01); *G06T 2207/20216* (2013.01); *G06T 2207/30252* (2013.01); *H04N 5/3765* (2013.01)

(58) Field of Classification Search
CPC ........ H04N 5/341; H04N 5/351; H04N 5/357; H04N 5/3765; H04N 5/378
See application file for complete search history.

(56) References Cited

U.S. PATENT DOCUMENTS

| | | |
|---|---|---|
| 7,633,540 B2 | 12/2009 | Totsuka |
| 7,990,440 B2 | 8/2011 | Kobayashi |

(Continued)

FOREIGN PATENT DOCUMENTS

JP    2012-80252    4/2012

OTHER PUBLICATIONS

U.S. Appl. No. 16/100,510, filed Aug. 10, 2018, by Hirofumi Totsuka et al.

(Continued)

*Primary Examiner* — Md N Haque
(74) *Attorney, Agent, or Firm* — Venable LLP

(57) ABSTRACT

A solid-state imaging device includes a pixel array unit in which pixels each including a photoelectric converter are arranged over rows and columns, output lines each connected to the pixels arranged on a corresponding column, and column circuits each connected to a corresponding output line. Each column circuit is configured to operate in a first mode and a second mode, in the first mode, the common circuit amplifies a single signal based on charges generated in the photoelectric converter of one pixel connected to the corresponding output line at a common gain to output a first pixel signal and a second pixel signal, and in the second mode, the column circuit amplifies the single signal at a first gain to output a first pixel signal and amplifies the single signal at a second gain lower than the first gain to output a second pixel signal.

16 Claims, 12 Drawing Sheets

(51) Int. Cl.
*G06T 5/50* (2006.01)
*G06T 5/00* (2006.01)
*H04N 5/376* (2011.01)

(56) References Cited

U.S. PATENT DOCUMENTS

| | | | |
|---|---|---|---|
| 8,084,729 | B2 | 12/2011 | Kato |
| 8,154,639 | B2 | 4/2012 | Kato |
| 8,189,081 | B2 | 5/2012 | Totsuka |
| 8,309,898 | B2 | 11/2012 | Kato |
| 8,411,185 | B2 | 4/2013 | Totsuka |
| 8,553,118 | B2 | 10/2013 | Saito |
| 8,605,182 | B2 | 12/2013 | Totsuka |
| 8,937,672 | B2 | 1/2015 | Totsuka |
| 9,013,765 | B2 | 4/2015 | Totsuka |
| 9,282,263 | B2 | 3/2016 | Totsuka |
| 9,332,202 | B2 | 5/2016 | Totsuka |
| 9,350,958 | B2 | 5/2016 | Totsuka |
| 9,716,849 | B2 | 7/2017 | Kobayashi |
| 9,787,932 | B2 | 10/2017 | Totsuka |
| 9,838,633 | B2 | 12/2017 | Muto |
| 9,876,975 | B2 | 1/2018 | Yoshida |
| 10,003,761 | B2 | 6/2018 | Totsuka |
| 10,057,519 | B2 | 8/2018 | Kobayashi |
| 2008/0079825 | A1* | 4/2008 | Matsuda ............... H04N 5/357 348/241 |
| 2008/0239124 | A1* | 10/2008 | Mori .................... H04N 5/3655 348/308 |
| 2009/0091806 | A1* | 4/2009 | Inuiya .................. H04N 5/376 358/482 |
| 2009/0141157 | A1* | 6/2009 | Kobayashi ........... H04N 5/3575 348/308 |
| 2011/0242380 | A1* | 10/2011 | Ogura .................. H04N 5/357 348/300 |
| 2013/0062503 | A1* | 3/2013 | Saito ...................... H03M 1/08 250/208.1 |
| 2013/0162874 | A1* | 6/2013 | Hashimoto ........... H04N 5/378 348/300 |
| 2015/0083895 | A1* | 3/2015 | Hashimoto ........... H04N 5/243 250/208.1 |
| 2018/0098013 | A1 | 4/2018 | Yoshida |
| 2018/0139396 | A1 | 5/2018 | Totsuka |
| 2018/0262706 | A1 | 9/2018 | Totsuka |

OTHER PUBLICATIONS

U.S. Appl. No. 16/008,643, filed Jun. 14, 2018, by Masahiro Kobayashi et al.

\* cited by examiner

SOLID-STATE IMAGING DEVICE AND IMAGING SYSTEM

BACKGROUND OF THE INVENTION

Field of the Invention

The present invention relates to a solid-state imaging device and an imaging system.

Description of the Related Art

In recent years, solid-state imaging devices represented by a CMOS image sensor or a CCD image sensor are widely used in imaging systems such as a digital camera, a digital camcorder, a surveillance camera, or the like. In an increasing demand for improvement in performance of such imaging systems, further improvement in performance of solid-state imaging devices is also demanded. Japanese Patent Application Laid-Open No. 2012-080252 discloses a solid-state imaging device configured to read out a signal of one pixel with two different types of gains for the purpose of achieving both improvement of the S/N ratio and expansion of the dynamic range.

However, the solid-state imaging device disclosed in Japanese Patent Application Laid-Open No. 2012-080252 is configured to always read out a pixel signal with two types of gains regardless of the brightness condition of a captured object, and reduction in pixel noise in a low brightness condition is not particularly considered. Thus, in the solid-state imaging device disclosed in Japanese Patent Application Laid-Open No. 2012-080252, the effect of noise reduction is insufficient especially in a low brightness condition.

SUMMARY OF THE INVENTION

The present invention intends to provide a solid-state imaging device and an imaging system that can reduce noise when reading out a single pixel signal with multiple types of gains.

According to one aspect of the present invention, there is provided is a solid-state imaging device including a pixel array unit in which a plurality of pixels each including a photoelectric converter are arranged over a plurality of rows and a plurality of columns, a plurality of output lines each connected to the pixels arranged on a corresponding column of the plurality of columns, and a plurality of column circuits each connected to a corresponding output line of the plurality of output lines, wherein each of the plurality of column circuits is configured to operate in a first mode and a second mode, in the first mode, the column circuit amplifies a single signal based on charges generated in the photoelectric converter of at least one pixel connected to the corresponding output line at a common gain to output a first pixel signal and a second pixel signal, and in the second mode, the column circuit amplifies the single signal at a first gain to output a first pixel signal and amplifies the single signal at a second gain that is lower than the first gain to output a second pixel signal.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

A solid-state imaging device and a method of driving the same according to a first embodiment of the present invention will be described with reference to FIG. 1 to FIG. 5B.

Figure 1:
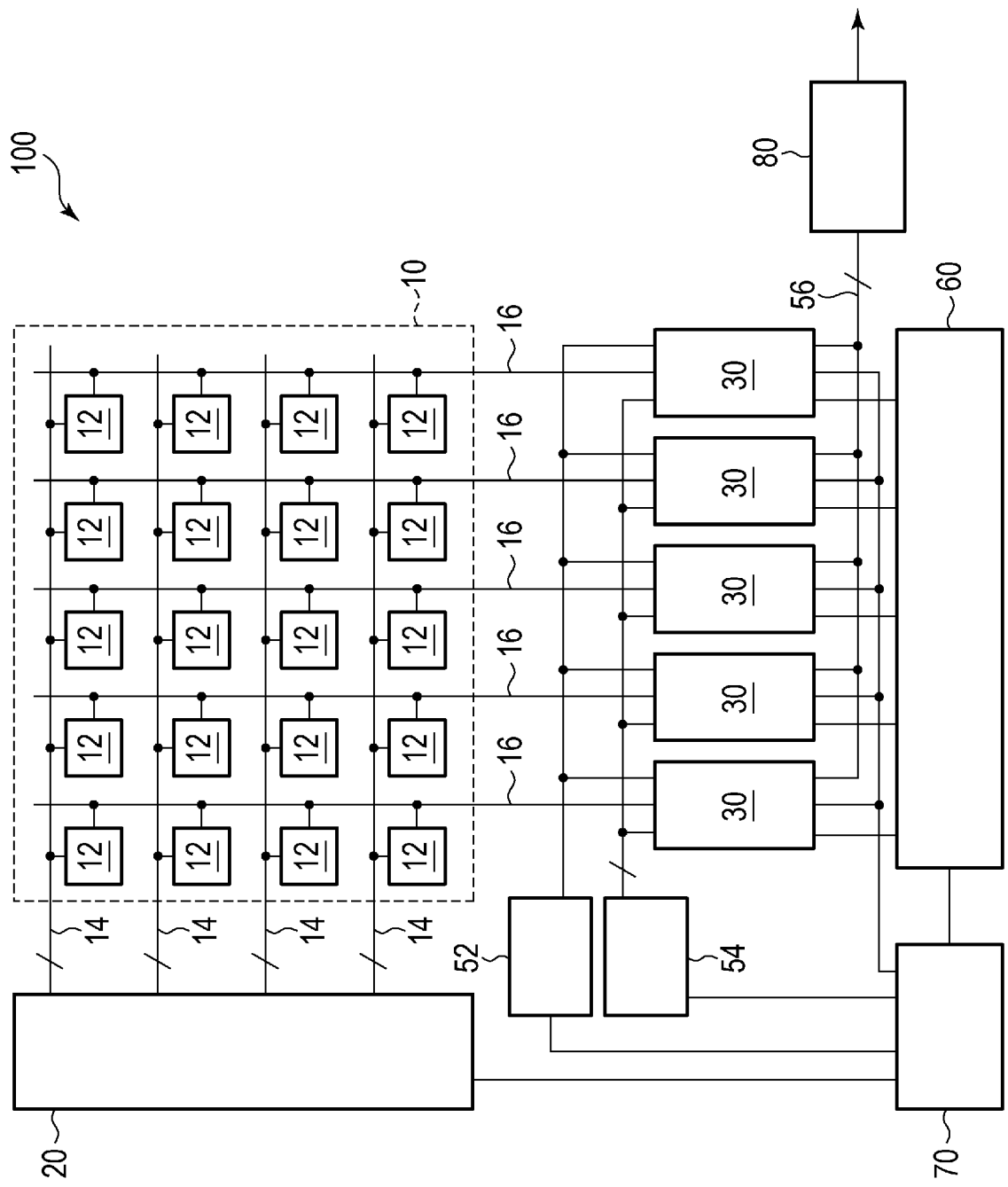
FIG. 1 is a block diagram illustrating a general configuration of a solid-state imaging device according to a first embodiment.
Figure 2:
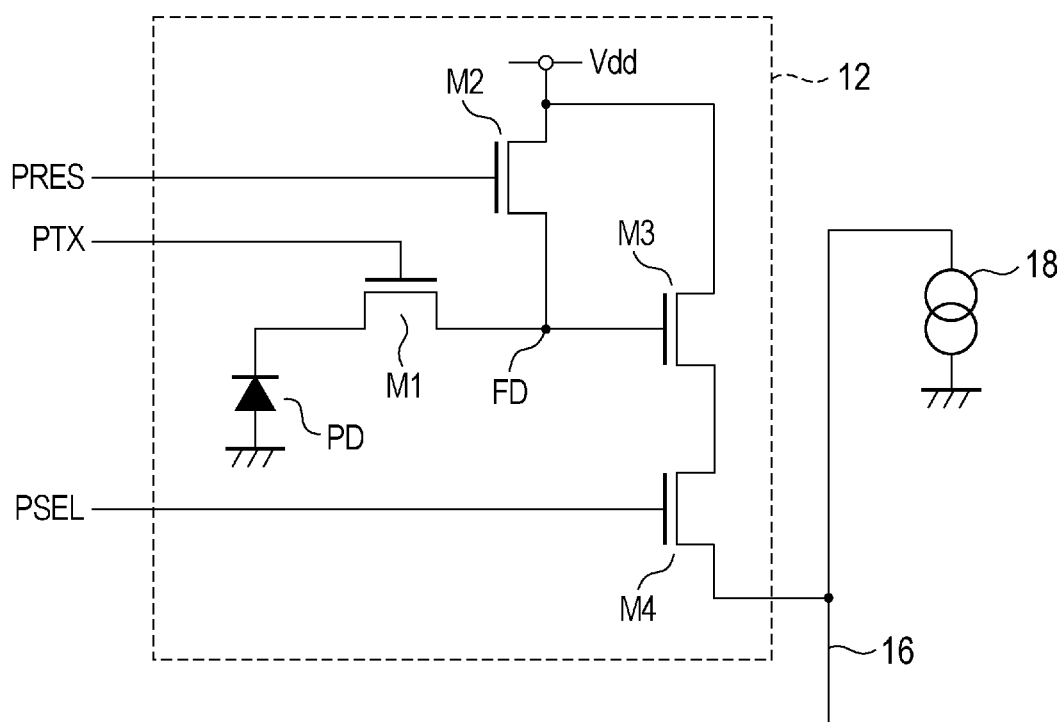
FIG. 2 is a circuit diagram illustrating a configuration example of a pixel of the solid-state imaging device according to the first embodiment.
Figure 3:
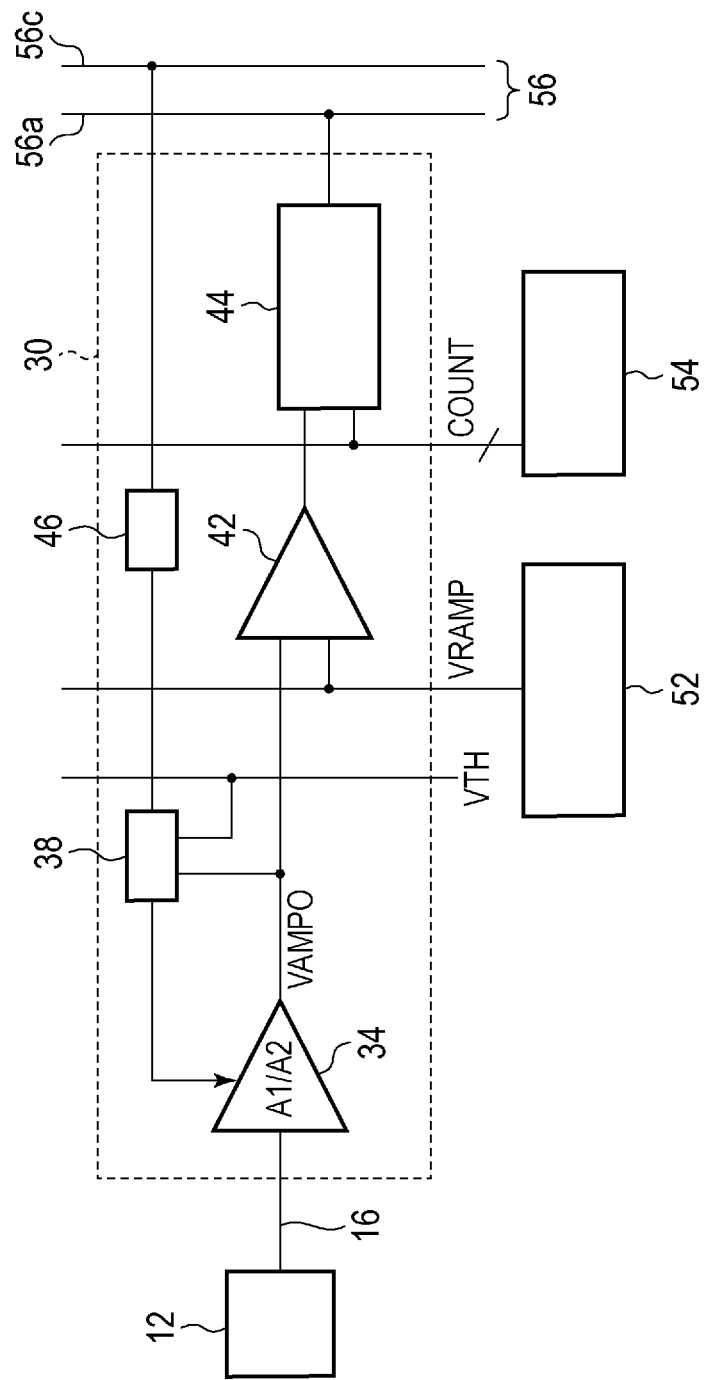
FIG. 3 is a circuit diagram illustrating a configuration example of a column circuit of the solid-state imaging device according to the first embodiment.

First, the structure of the solid-state imaging device according to the present embodiment will be described by using FIG. 1 to FIG. 3. FIG. 1 is a block diagram illustrating a general configuration of the solid-state imaging device according to the present embodiment. FIG. 2 is a circuit diagram illustrating a configuration example of a pixel of the solid-state imaging device according to the present embodiment. FIG. 3 is a circuit diagram illustrating a configuration example of a column circuit of the solid-state imaging device according to the present embodiment.

The solid-state imaging device 100 according to the present embodiment includes a pixel array unit 10, a vertical scanning circuit 20, column circuits 30, a reference signal generating circuit 52, a counter 54, a horizontal scanning circuit 60, a control circuit 70, and a signal processing unit 80 as illustrated in FIG. 1.

In the pixel array unit 10, a plurality of pixels 12 are provided in a matrix over a plurality of rows and a plurality of columns. In FIG. 1, although 20 pixels 12 arranged in four rows by five columns are illustrated as the pixels 12 forming the pixel array unit 10, the number of pixels 12 forming the pixel array unit 10 is not particularly limited.

On each row of the pixel array unit 10, a control line 14 is arranged extending in a first direction (the horizontal direction in FIG. 1). The control line 14 is connected to the pixels 12 aligned in the first direction, respectively, to form a signal line common to these pixels 12. The first direction in which the control line 14 extends may be referred to as a row direction in the present specification.

Further, on each column of the pixel array unit 10, a vertical output line 16 is arranged extending in a second direction intersecting with the first direction (the vertical direction in FIG. 1). The vertical output line 16 is connected to the pixels 12 aligned in the second direction, respectively, to form a signal line common to these pixels 12. The second direction in which the vertical output line 16 extends may be referred to as a column direction in the present specification.

The control line 14 on each row is connected to the vertical scanning circuit 20. The vertical scanning circuit 20 is a circuit unit that supplies, to the pixels 12 via the control lines 14, control signals used for driving readout circuits inside the pixels 12 when pixel signals are read out from the pixels 12. The vertical output line 16 on each column is connected to the column circuit 30.

The column circuit 30 on each column is connected to the reference signal generating circuit 52, the counter 54, and the horizontal scanning circuit 60. The reference signal generating circuit 52 is a circuit that outputs a signal whose voltage changes with time, for example, a ramp signal as a reference signal. The counter 54 is a circuit that counts the number of clocks in a clock signal generated by the control circuit 70 and outputs the count signal corresponding to the count value to the column circuits 30.

Further, the column circuit 30 on each column is connected to the horizontal scanning circuit 60 and the signal processing unit 80 via the horizontal output line 56. The horizontal scanning circuit 60 sequentially outputs control signals to the column circuits 30 on respective columns. Upon receiving the control signal from the horizontal scanning circuit 60, the column circuit 30 outputs the stored digital pixel signal to the signal processing unit 80 via the horizontal output line 56.

The control circuit 70 is connected to the vertical scanning circuit 20, the column circuits 30, the reference signal generating circuit 52, the counter 54, and the horizontal scanning circuit 60. The control circuit 70 is a circuit that supplies a control signal to the vertical scanning circuit 20, the column circuits 30, the reference signal generating circuit 52, the counter 54, the horizontal scanning circuit 60, and the like for controlling the operation thereof or a timing thereof. At least some of these control signals may be supplied from the outside of the solid-state imaging device 100.

The signal processing unit 80 is a circuit unit that performs predetermined signal processing such as correlated double sampling (CDS), for example, on a signal output from the column circuit 30 on each column. At least a part of the functions of the signal processing unit 80 may be provided in an external device of the solid-state imaging device 100. When the solid-state imaging device 100 includes the signal processing unit 80, a stacked-type solid-state imaging device 100 in which a first semiconductor substrate on which at least the pixel array unit 10 is arranged and a second semiconductor substrate on which at least the signal processing unit 80 is arranged are connected to each other by interconnections may be formed.

FIG. 2 is a circuit diagram illustrating a configuration example of the pixel 12. Each of the plurality of pixels 12 includes a photoelectric converter PD, a transfer transistor M1, a reset transistor M2, an amplifier transistor M3, and a select transistor M4.

The photoelectric converter PD is a photodiode, for example. The photodiode forming the photoelectric converter PD has the anode connected to a ground node (GND) and the cathode connected to the source of the transfer transistor M1. The drain of the transfer transistor M1 is connected to the source of the reset transistor M2 and the gate of the amplifier transistor M3. The connection node of the drain of the transfer transistor M1, the source of the reset transistor M2, and the gate of the amplifier transistor M3 is a so-called floating diffusion FD. The floating diffusion FD includes a capacitance component, functions as a charge holding portion, and forms a charge-to-voltage conversion unit having that capacitance component. The drain of the reset transistor M2 and the drain of the amplifier transistor M3 are connected to a power supply node (voltage Vdd). The source of the amplifier transistor M3 is connected to the drain of the select transistor M4. The source of the select transistor M4 is connected to the vertical output line 16. A current source 18 is connected to the vertical output line 16. Note that the terms of source and drain of a transistor may differ depending on the conductivity type of the transistor, the focused function, or the like and may be referred to by the opposite terms of source and drain described above.

In the case of the circuit configuration illustrated in FIG. 2, the control line 14 on each row includes a transfer gate signal line, a reset signal line, and a select signal line (none of them are illustrated). The transfer gate signal line is connected to the gates of the transfer transistors M1 of the pixels 12 belonging to the corresponding row and supplies a control signal PTX output from the vertical scanning circuit 20 to the gates of the transfer transistors M1. The reset signal line is connected to the gates of the reset transistors M2 of the pixels 12 belonging to the corresponding row and supplies a control signal PRES output from the vertical scanning circuit 20 to the gates of the reset transistors M2. The select signal line is connected to the gates of the select transistors M4 of the pixels 12 belonging to the corresponding row and supplies a control signal PSEL output from the vertical scanning circuit 20 to the gates of the select transistors M4. When each transistor of the pixel 12 is formed of an n-channel transistor, when a high-level control signal is supplied from the vertical scanning circuit 20, the corresponding transistor is turned on, and when a low-level control signal is supplied from the vertical scanning circuit 20, the corresponding transistor is turned off.

When an optical image of an object enters the pixel array unit 10, the photoelectric converter PD of each pixel 12 converts (photoelectrically converts) an incident light into charges, the amount of which is in accordance with the light amount, and accumulates the generated charges. When turned on, the transfer transistor M1 transfers charges of the photoelectric converter PD to the floating diffusion FD. The floating diffusion FD is set to a voltage corresponding to the amount of charges transferred from the photoelectric conversion PD by charge-to-voltage conversion due to the capacitance component thereof. The amplifier transistor M3 is configured such that the voltage Vdd is supplied to the drain and a bias current is supplied from the current source 18 to the source via the select transistor M4 and forms an amplifier unit (source follower circuit) whose gate is the input node. Thereby, the amplifier transistor M3 outputs a signal based on the voltage of the floating diffusion FD to the vertical output line 16 via the select transistor M4. When turned on, the reset transistor M2 resets the floating diffusion FD to a voltage in accordance with the voltage Vdd.

The transfer transistor M1, the reset transistor M2, and the select transistor M4 of the pixel 12 are controlled on a row basis by the control signals PTX, PRES, and PSEL supplied from the vertical scanning circuit 20. The pixel signals of the plurality of pixels 12 belonging to a row selected by the control signal PSEL (selected row) are simultaneously output to the vertical output lines 16 on respective columns.

FIG. 3 is a circuit diagram illustrating a configuration example of the column circuit 30. The column circuit 30 on each column includes a variable amplifier circuit 34, an analog comparator unit 38, a comparator 42, and memories 44 and 46.

The vertical output line 16 on each column of the pixel array unit 10 is connected to the input terminal of the variable amplifier circuit 34 which is also the input node of the column circuit 30. The variable amplifier circuit 34 amplifies the pixel signal output from the pixel 12 via the vertical output line 16 (analog pixel signal) at a predetermined gain and outputs the amplified signal. The variable amplifier circuit 34 is an amplifier circuit capable of changing an amplification factor and includes at least a gain A1 and a gain A2 that is lower than A1 as amplification factors. For example, the gain A1 is a power multiple of the gain A2. In the following description, although it is assumed that the gain A1 is four-fold and the gain A2 is one-fold, the value of the gain is not particularly limited.

The output terminal of the variable amplifier circuit 34 is connected to one of the two input terminals of the comparator 42 and one of the two input terminals of the analog comparator unit 38. The threshold voltage VTH is supplied to the other input terminal of the two input terminals of the analog comparator unit 38. The analog comparator unit 38 is a comparator circuit that compares the level of the output signal VAMPO of the variable amplifier unit 34 with the level of the threshold voltage VTH. The threshold voltage VTH can be any threshold voltage supplied from the outside of the column circuit 30 (for example, the control circuit 70). The analog comparator unit 38 is connected to the variable amplifier circuit 34 and the memory 46. The amplification factor of the variable amplifier circuit 34 can be set by the control signal from the control circuit 70 or can be set based on the result of comparison between the level of the output signal of the variable amplifier circuit 34 and the level of the threshold voltage VTH supplied from the analog comparator unit 38. The memory 46 stores the result of the comparison between the level of the output signal of the variable amplifier circuit 34 and the level of the threshold voltage VTH supplied from the analog comparator unit 38.

The reference signal generating circuit 52 is connected to the other input terminal of the two input terminals of the comparator 42. The comparator 42 is a comparator circuit that compares the level of the output signal VAMPO of the variable amplifier circuit 34 with the level of a reference signal VRAMP output from the reference signal generating circuit 52. The output terminal of the comparator 42 is connected to the memory 44. The comparator 42 compares the level of the output signal VAMPO of the variable amplifier circuit 34 with the level of the reference signal VRAMP, and when the relationship of these signal levels is inverted, outputs a latch signal to the memory 44.

The counter 54 is connected to the memory 44. The memory 44 stores the count value indicated by a count signal COUNT that is being output from the counter 54 as a digital value of the pixel signal (digital pixel signal) at the time of receiving the latch signal from the comparator 42. The horizontal output line 56 includes an output line 56a and an output line 56c. The memory 44 is connected to the output line 56a. The memory 46 is connected to the output line 56c. In response to the control signal from the horizontal scanning circuit 60, the memory 44 outputs the stored digital pixel signal to the signal processing unit 80 via the output line 56a. Further, in response to the control signal from the horizontal scanning circuit 60, the memory 46 outputs, to the signal processing unit 80 via the output line 56c, a signal corresponding to the result of comparison between the level of the stored output signal of the variable amplifier circuit 34 and the level of the threshold voltage VTH.

Figure 4:
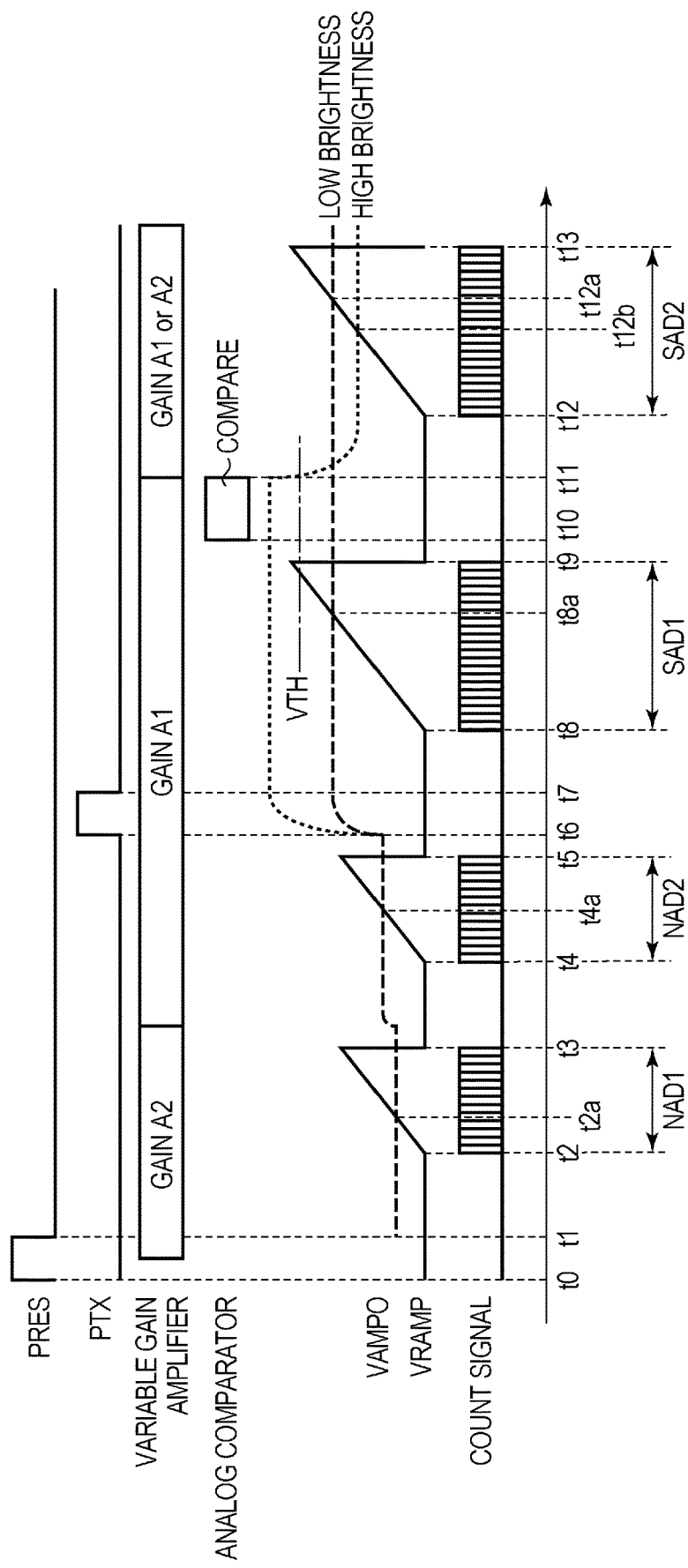
FIG. 4 is a timing diagram illustrating a method of driving the solid-state imaging device according to the first embodiment.

Next, a method of driving the solid-state imaging device according to the present embodiment will be described by using FIG. 4. FIG. 4 is a timing diagram illustrating a method of driving the solid-state imaging device according to the present embodiment. FIG. 4 illustrates the control signals PRES and PTX supplied to the pixels 12 belonging to the row to be read, the amplification factor of the variable amplifier circuit 34, the operation state of the analog comparator unit 38, and the output periods of the output signal VAMPO, the reference signal VRAMP, and the count signal COUNT.

Note that, although the control signal PSEL is not illustrated in FIG. 4, a high-level control signal PSEL is supplied to a select signal line on a row (selected row) to be read out, and a low-level control signal PSEL is supplied to select signal lines on other rows (unselected rows). On the selected row, the select transistor M4 of the pixel 12 belonging to the row is turned on by the high-level control signal PSEL, and the pixel signal can be output to the vertical output line 16. The control signals PSEL, PRES, and PTX of the unselected rows are held at a low level. The control signals PSEL, PRES, and PTX are supplied from the vertical scanning circuit 20 under the control of the control circuit 70.

The control signals PRES and PTX are at a low level at time t0. In the subsequent period from the time t0 to time t1, the control signal PRES is controlled at a high level, and the reset transistor M2 is turned on. Thereby, the floating diffusion FD of the pixel 12 is reset to a voltage (reset voltage) of the reset level corresponding to the voltage Vdd. A pixel signal corresponding to the reset voltage of the floating diffusion FD is output from the pixel 12 to the vertical output line 16 on each column. At this time, the amplification factor of the variable amplifier circuit 34 is set to the gain A2 (one-fold), and the pixel signal (N-signal) output from the pixel 12 is amplified at the gain A2-fold in the variable amplifier circuit 34. FIG. 4 illustrates the output signal VAMPO of the variable amplifier circuit 34 by a dotted line and a dashed line. The dotted line indicates the output signal VAMPO of the variable amplifier circuit 34 at low brightness, and the dashed line indicates the output signal VAMPO of the variable amplifier circuit 34 at high brightness.

The subsequent period from time t2 to time t3 is an analog-to-digital (AD) conversion period (period NAD1) for converting the N-signal amplified at A2-fold from an analog signal to a digital signal. At the time t2, the reference signal generating circuit 52 starts a ramp-up of the reference signal VRAMP, and the counter 54 starts counting. Further, the comparator 42 starts comparison between the level of the output signal VAMPO and the level of the reference signal VRAMP. When the level of the reference signal VRAMP exceeds the level of the output signal VAMPO at time t2a, the output signal of the comparator 42 changes from a low level to a high level. By using this change in the output level of the comparator 42 as a latch signal, the memory 44 stores the count value indicated by the count signal COUNT that is being output from the counter 54 at that time as the digital value (digital pixel signal) of the pixel signal. This digital value stored in the memory 44 is denoted as ND1.

After the period NAD1 ends at the time t3, the reference signal generating circuit 52 resets the level of the reference signal VRAMP to the initial state. Further, the amplification factor of the variable amplifier circuit 34 is switched from the gain A2 to the gain A1 (four-fold). Thereby, the pixel signal (N-signal) output from the pixel 12 is amplified at the gain A1-fold in the variable amplifier circuit 34, and the output signal VAMPO increases.

The subsequent period from time t4 to time t5 is an AD conversion period (period NAD2) of the N-signal amplified at A1-fold. At the time t4, the reference signal generating circuit 52 starts a ramp-up of the reference signal VRAMP, and the counter 54 starts counting. Further, the comparator 42 starts comparison between the level of the output signal VAMPO and the level of the reference signal VRAMP. When the level of the reference signal VRAMP exceeds the level of the output signal VAMPO at time t4a, the output signal of the comparator 42 changes from a low level to a high level. By using this change in the output level of the comparator 42 as a latch signal, the memory 44 stores the count value indicated by the count signal COUNT that is being output from the counter 54 at that time as the digital value (digital pixel signal) of the pixel signal. This digital value stored in the memory 44 is denoted as ND2.

After the period NAD2 ends at the time t5, the reference signal generating circuit 52 resets the level of the reference signal VRAMP to the initial state.

In the subsequent period from time t6 to time t7, the control signal PTX is controlled at a high level, and the transfer transistor M1 is turned on. Thereby, the signal charges accumulated in the photoelectric converter PD of the pixel 12 are transferred to the floating diffusion FD. The floating diffusion FD has a voltage corresponding to the amount of the signal charges transferred from the photoelectric converter PD. The pixel signal corresponding to the amount of the signal charges generated in the photoelectric converter PD is output from the pixel 12 to the vertical output line 16 on each column. At this time, the amplification factor of the variable amplifier circuit 34 is set to the gain A1 (four-fold), the pixel signal (S-signal) output from the pixel 12 is amplified at the gain A1-fold in the variable amplifier circuit 34.

The subsequent period from time t8 to time t9 is an AD conversion period (period SAD1) of the S-signal amplified at A1-fold. At the time t8, the reference signal generating circuit 52 starts a ramp-up of the reference signal VRAMP, and the counter 54 starts counting. Further, the comparator 42 starts comparison between the level of the output signal VAMPO and the level of the reference signal VRAMP.

As is illustrated in FIG. 4 as the output signal VAMPO at low brightness, when the level of the output signal VAMPO is lower than the level of the reference signal VRAMP at the time t9, the level of the reference signal VRAMP exceeds the level of the output signal VAMPO, for example, at time t8a. This causes the output signal of the comparator 42 to change from a low level to a high level, and the memory 44 stores the count value indicated by the count signal COUNT that is being output from the counter 54 at that time as the digital value (digital pixel signal) of the pixel signal. This digital value stored in the memory 44 is denoted as SD1.

On the other hand, as is illustrated in FIG. 4 as the output signal VAMPO at high brightness, when the level of the output signal VAMPO is higher than the level of the reference signal VRAMP at the time t9, the level of the reference signal VRAMP does not exceed the level of the output signal VAMPO. Thus, the output signal of the comparator 42 is not inverted, and the memory 44 does not store a digital value corresponding to the S-signal amplified at A1-fold but stores the count value indicated by the count signal COUNT at the time t9, for example.

After the period SAD1 ends at the time t9, the reference signal generating circuit 52 resets the level of the reference signal VRAMP to the initial state.

In the subsequent period from time t10 to time t11, the analog comparator unit 38 compares the level of the output signal VAMPO of the variable amplifier circuit 34 with the level of the threshold voltage VTH. The comparison result between the level of the output signal VAMPO and the level of the threshold voltage VTH is used for setting the amplification factor of the variable amplifier circuit 34. That is, when the level of the output signal VAMPO is lower than the level of the threshold voltage VTH, the amplification factor of the variable amplifier circuit 34 is maintained at the gain A1. On the other hand, when the level of the output signal VAMPO is higher than the level of the threshold voltage VTH, the amplification factor of the variable amplifier circuit 34 is switched from the gain A1 to the gain A2. Thereby, the level of the output signal VAMPO is reduced as illustrated by the dotted line in FIG. 4.

Hereinafter, an operation when the amplification factor of the variable amplifier circuit 34 is maintained at the gain A1 is referred to as a first mode, and an operation when the amplification factor of the variable amplifier circuit 34 is switched from the gain A1 to the gain A2 is referred to as a second mode. The comparison result by the analog comparator unit 38 is stored in the memory 46 as a mode identification signal used for identifying which of the first mode or the second mode has been applied to the operation.

The threshold voltage VTH is set to a level slightly lower than the amplitude of the reference signal VRAMP in the period SAD1. By doing so, when the output signal VAMPO set to the gain A1 (four-fold) is lower than the threshold voltage VTH, the level of the output signal VAMPO falls in the range of the reference signal VRAMP, and thus the AD conversion of the output signal VAMPO can be reliably performed.

The subsequent period from time t12 to time t13 is an AD conversion period (period SAD2) of the S-signal amplified at A1-fold or A2-fold. At the time t12, the reference signal generating circuit 52 starts a ramp-up of the reference signal VRAMP, and the counter 54 starts counting. Further, the comparator 42 starts comparison between the level of the output signal VAMPO and the level of the reference signal VRAMP. At this timing, the amplitude of the reference signal VRAMP in the period SAD2 is set to be larger than or equal to the signal range of the output signal VAMPO when the amplification factor of the variable amplifier circuit 34 is the gain A1. For example, with the same amplitude of the reference signal VRAMP in the period SAD 1 and the period SAD 2, the signal range AD-converted in the period SAD 1 is approximately a quarter the signal range AD-converted in the period SAD 2.

It is assumed that, in low brightness, the level of the reference signal VRAMP exceeds the level of the output signal VAMPO at time t12a. Further, it is assumed that, in high brightness, the level of the reference signal VRAMP exceeds the level of the output signal VAMPO at time t12b. When the level of the reference signal VRAMP exceeds the level of the output signal VAMPO, the output signal of the comparator 42 changes from a low level to a high level. By using this change in the output level of the comparator 42 as a latch signal, the memory 44 stores the count value indicated by the count signal COUNT that is being output from the counter 54 at that time as the digital value (digital pixel signal) of the pixel signal. This digital value stored in the memory 44 is denoted as SD2.

As described above, in the drive method of the present embodiment, the digital value SD1 and the digital value SD2 are output in this order in a time-division manner.

After the time t13 when the period SAD 2 ends, in response to the control signal from the horizontal scanning circuit 60, the digital output signals of the digital values ND1, ND2, SD1, and SD2 stored in the memory 44 are output to the signal processing unit 80 on the post-stage via the output line 56a. Similarly, in response to the control signal from the horizontal scanning circuit 60, the mode identification signal stored in the memory 46 is output to the signal processing unit 80 on the post-stage via the output line 56c.

Note that the periods NAD1, NAD2, SAD1, and SAD2 may not necessarily be implemented in the order described above. When these periods are implemented in the order described above, however, the readout of the N-signal and the S-signal can be performed at the gain A1 which is a high gain without insertion of a switching operation of the amplification factor of the variable amplifier circuit 34, and this can suppress occurrence of image quality degradation or the like that would otherwise be caused by a gain switching operation.

In the signal processing unit 80 or a signal processing unit (not illustrated) outside the solid-state imaging device 100, a CDS process is performed by using the digital output signals of the digital values ND1, ND2, SD1, and SD2 and the mode identification signal output from the column circuit 30.

When the mode identification signal indicates the first mode, the digital values SD1 and SD2 are AD-converted at a common gain, for example, both at the gain A1, and therefore an object for the subtraction process in the CDS process is the digital value ND2. Thus, an output signal OUT1 and an output signal OUT2 are calculated according to the following Equations, respectively.

$$OUT1 = SD1 - ND2$$

$$OUT2 = SD2 - ND2$$

On the other hand, when the mode identification signal indicates the second mode, an object for the subtraction process in the CDS process of the digital value SD1 is the digital value ND2, and an object for the subtraction process in the CDS process of the digital value SD2 is the digital value ND1. Therefore, the output signal OUT1 and the output signal OUT2 are calculated according to the following Equations, respectively.

$$OUT1 = SD1 - ND2$$

$$OUT2 = 4 \times (SD2 - ND1)$$

Since the output signal OUT2 in the second mode is a result of the readout when the variable amplifier circuit 34 is the gain A2 (one-fold), in order to match the range to the result readout at the gain A1 (four-fold), the value resulted by the CDS process is multiplied by four-fold that is the gain ratio. A gain ratio as used herein means a ratio of the gain A1 to the gain A2. In the case of the second mode, since the output signal OUT1 exceeds the range of the reference signal VRAMP during the period SAD2 as described above, the AD conversion corresponding to the pixel signal level is not performed. Therefore, the CDS process of the output signal OUT1 may be omitted in the second mode.

Note that, in the example of driving described above, although a configuration in which a CDS process is performed in the signal processing unit 80 has been described, the memory 44 may be formed of a ripple counter to perform the CDS process described above within the column circuit 30. Further, although the analog comparator unit 38 is arranged on the post-stage of the variable amplifier circuit 34 in the present embodiment, a configuration in which the analog comparator unit 38 is arranged on the post-stage of the variable amplifier circuit 34 and the pixel signal and the threshold voltage VTH are compared on the post-stage of amplification by using the variable amplifier circuit 34 may be employed. Alternatively, the operation of the analog comparator unit 38 may be performed by the comparator 42. In this case, the threshold voltage VTH may be input to the comparator 42, or the reference signal VRAMP may be controlled to the same level as the VTH.

Figure 5A:
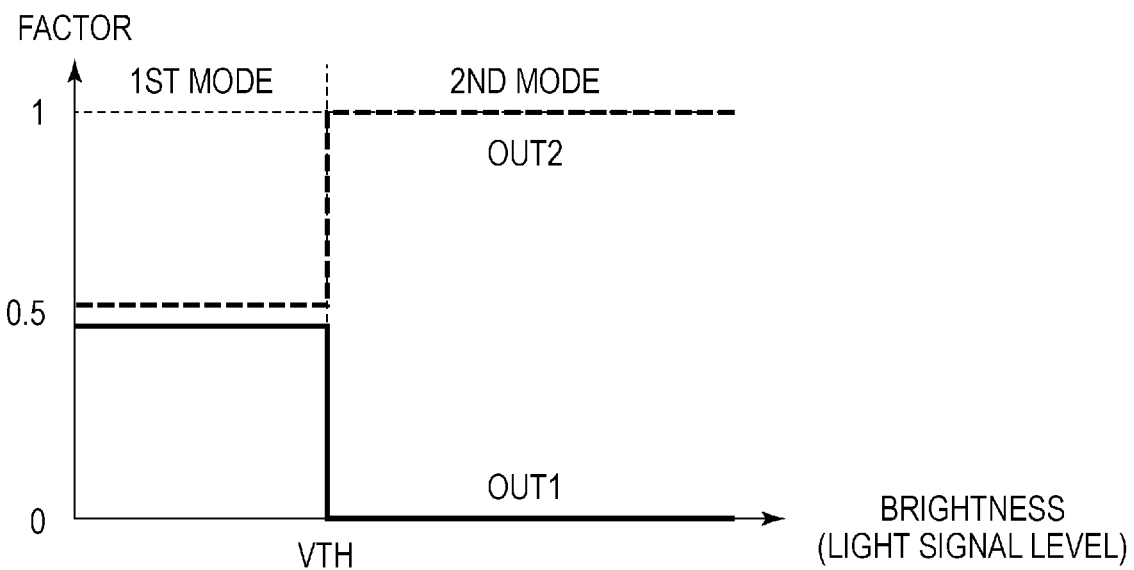
FIG. 5A and FIG. 5B are diagrams illustrating an image processing method in a signal processing unit.
Figure 5B:
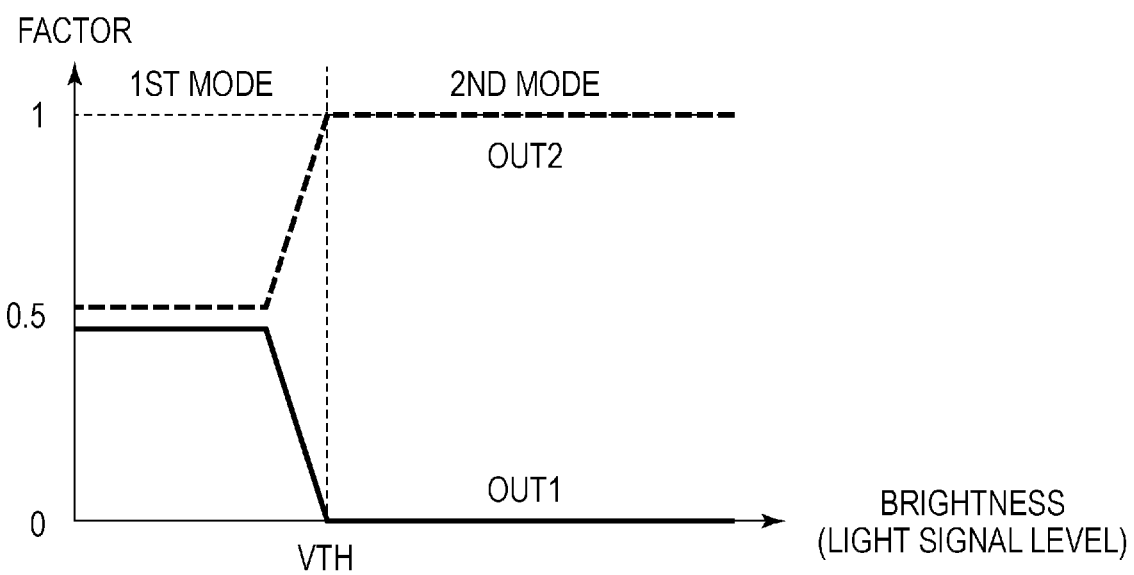

Next, image processing subsequent to the CDS process performed in the signal processing unit 80 or a signal processing unit (not illustrated) outside the solid-state imaging device 100 will be described by using FIG. 5A and FIG. 5B. FIG. 5A and FIG. 5B are diagrams illustrating an image processing method in the signal processing unit.

When the output signals OUT1 and OUT2 are read out in the first mode, an averaging process is applied to these signals to obtain the final image signal. Since the output signals OUT1 and OUT2 read out in the first mode are signals read out from the same pixel 12 with the same gain, by applying the averaging process thereto, it is possible to reduce noise in low brightness corresponding to a light signal level lower than the threshold voltage VTH. On the other hand, when the output signals OUT1 and OUT2 are read out in the second mode, the output signal OUT1 is not used because the AD conversion corresponding to the level of the pixel signal is not performed, and only the output signal OUT2 is used as the final image signal.

FIG. 5A illustrates a process performed at this timing corresponding to a light signal level. That is, when the output signals OUT1 and OUT2 are read out in the first mode, the output signals OUT1 and OUT2 are multiplied by the coefficient 0.5 and added (that is, averaged), respectively. When the output signals OUT1 and OUT2 are read out in the second mode, the output signal OUT1 is multiplied by 0 and the output signal OUT2 is multiplied by 1, and the resulted values are then added.

Alternatively, the output signals OUT1 and OUT2 may be weighted and averaged such that the weighting of the output signal OUT2 is larger as the output signals OUT1 and OUT2 are closer to the threshold voltage VTH. As illustrated in FIG. 5B, for example, when the output signals OUT1 and OUT2 are read out in the first mode and are below a certain light signal level, the result of applying averaging to the output signals OUT1 and OUT2 is the final image signal in the same manner as in the case of FIG. 5A. When they are above the certain light signal level, the output signal OUT1 is multiplied by a first coefficient in the range of 0 to 0.5, and the output signal OUT2 is multiplied by a second coefficient in the range of 0.5 to 1. When the output signals OUT1 and OUT2 are read out in the second mode, the output signal OUT2 is the final image signal.

When the process is performed as FIG. 5A, a difference in noise levels may occur between an image signal output by averaging two output signals and an image signal formed of one output signal, and such a difference in noise levels may appear as a step in an image at a switching point of the mode. As illustrated in FIG. 5B, such a step can be reduced by changing the first coefficient and the second coefficient in accordance with the difference between the output signals OUT1 and OUT2 and the threshold voltage VTH.

The drive method of the present embodiment described above is configured to determine whether the first mode or the second mode is applied on a column basis for readout in accordance with the pixel signal level of each column. However, either the first mode or the second mode may be set to perform readout in accordance with a control signal from the outside of the solid-state imaging device 100. For example, the operation mode can be set based on a signal from the photometric device that measures the amount of light from an object. In the same manner as in the embodiments described later, the reading mode may also be set from the outside.

As described above, according to the present embodiment, it is possible to reduce noise in low brightness when reading out a single pixel signal with multiple types of gains.

Second Embodiment

Figure 6:
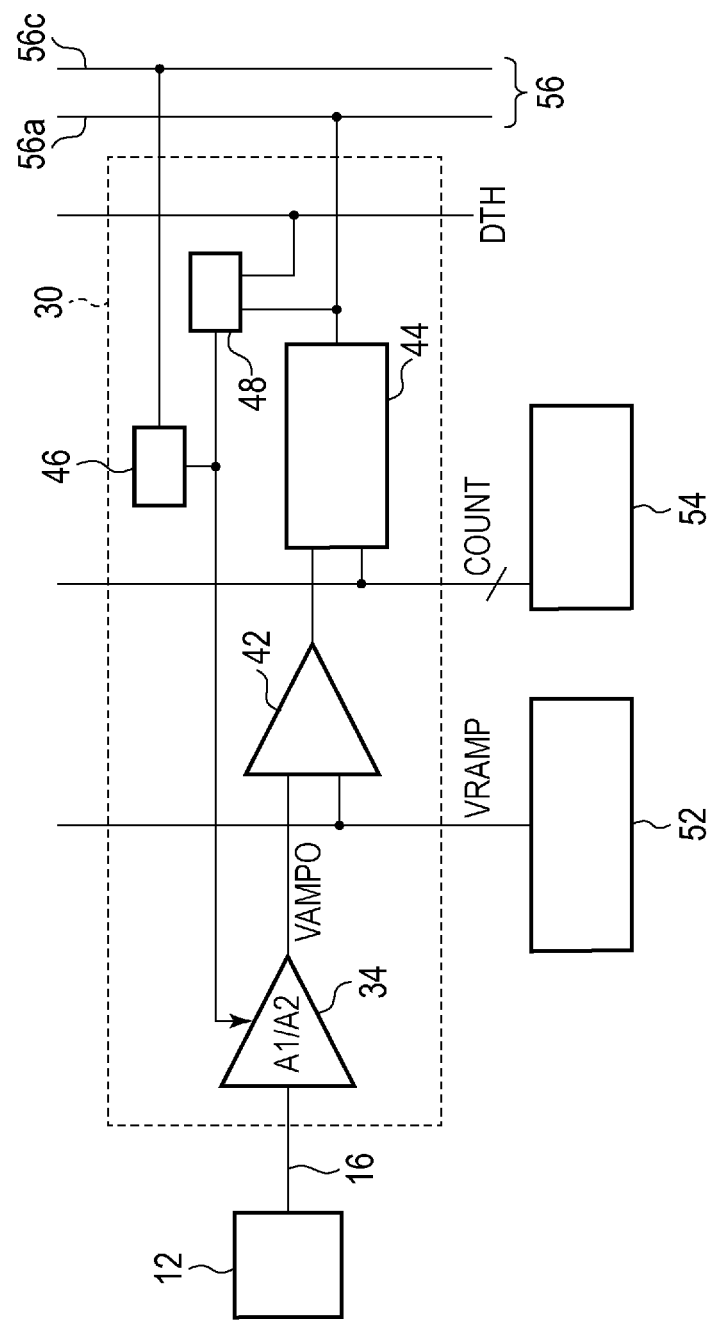
FIG. 6 is a circuit diagram illustrating a configuration example of a column circuit of a solid-state imaging device according to a second embodiment.

A solid-state imaging device and a method of driving the same according to a second embodiment of the present invention will be described with reference to FIG. 6. Components similar to those of the solid-state imaging devices according to the first embodiment are labeled with the same reference, and the description thereof will be omitted or simplified. FIG. 6 is a circuit diagram illustrating a configuration example of a column circuit of the solid-state imaging device according to the present embodiment.

The solid-state imaging device according to the present embodiment is the same as the solid-state imaging device according to the first embodiment except for the difference in the circuit configuration of the column circuit 30. That is, the column circuit 30 of the solid-state imaging device according to the present embodiment includes a digital comparator unit 48 instead of the analog comparator unit 38 as illustrated in FIG. 6. The digital comparator unit 48 is connected to the memories 44 and 46 and the variable amplifier circuit 34. The digital comparator unit 48 compares a digital value stored in the memory 44 with a digital threshold value DTH input from the outside (for example, the control circuit 70) of the column circuit 30 and outputs a comparison result to the memory 46 and the variable amplifier circuit 34.

Next, a method of driving the solid-state imaging device according to the present embodiment will be described with reference to FIG. 4. The method of driving the solid-state imaging device according to the present embodiment is the same as the drive method according to the first embodiment except that a comparison operation from the time t10 to the time t11 is performed in the digital comparator unit 48. The basic readout operation of the solid-state imaging device according to the present embodiment is the same as the timing diagram illustrated in FIG. 4.

In the solid-state imaging device according to the present embodiment, a digital value SD1 that is AD-converted during the period SAD1 and a digital threshold value DTH are compared. The result is then stored in the memory 46 as a mode identification signal and is fed back to the gain setting of the variable amplifier circuit 34. In the solid-state imaging device according to the present embodiment, since a comparison operation is performed in a digital circuit, a comparison process can be performed at a higher speed than that in the case of the first embodiment.

Further, when the digital threshold value DTH is set to about a quarter the signal range, for example, as with the case of the threshold voltage VTH, it is not necessary to input the values of all the bits of the digital value SD1 to the digital comparator unit 48. For example, when the signal range is eight bits (=255) and the digital threshold value DTH is set to 63 that is near a quarter the signal range, the level relationship may be determined based on whether or not the upper three bits of the digital value SD1 are [000]. When it is configured to perform comparison by using only a part of bits of the digital value SD1, the circuit configuration of the digital comparator unit 48 can be reduced, and a smaller chip area can be realized.

As described above, according to the present embodiment, it is possible to reduce noise in low brightness when reading out a single pixel signal with multiple types of gains.

Third Embodiment

Figure 7:
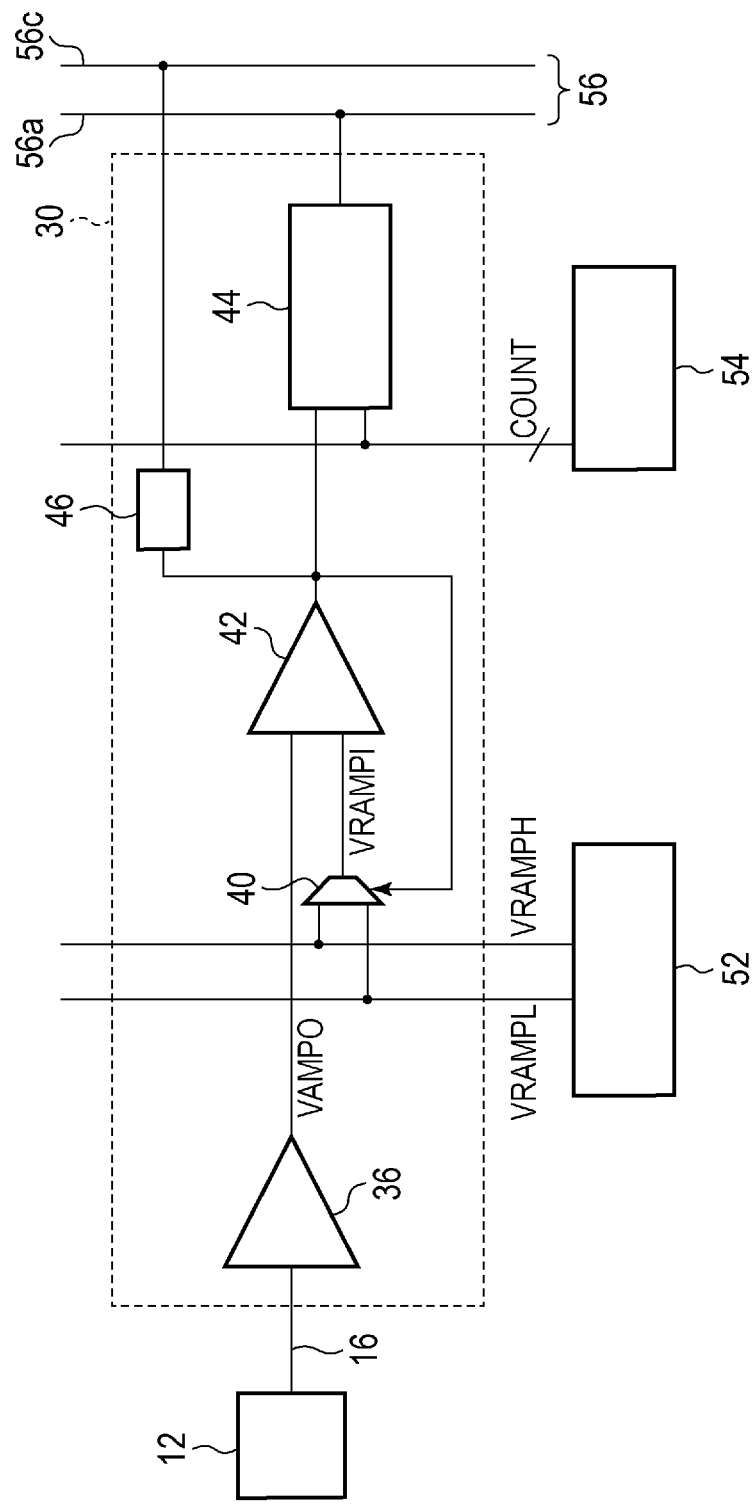
FIG. 7 is a circuit diagram illustrating a configuration example of a column circuit of a solid-state imaging device according to a third embodiment.

A solid-state imaging device and a method of driving the same according to a third embodiment of the present invention will be described with reference to FIG. 7 and FIG. 8. Components similar to those of the solid-state imaging devices 100 according to the first and second embodiments are labeled with the same reference, and the description thereof will be omitted or simplified.

In the first and second embodiments, readout of signals is performed with two different types of gains by changing the amplification factor of the variable amplifier circuit 34. In the present embodiment, a configuration in which signal readout is performed with two types of gains using two reference signals VRAMPL and VRAMPH having different slopes will be described.

First, the structure of the solid-state imaging device according to the present embodiment will be described by using FIG. 7. FIG. 7 is a circuit diagram illustrating a configuration example of a column circuit of the solid-state imaging device according to the present embodiment.

The solid-state imaging device according to the present embodiment is the same as the solid-state imaging device according to the first embodiment except for the difference in the circuit configuration of the column circuit 30. That is, as illustrated in FIG. 7, the column circuit 30 of the solid-state imaging device according to the present embodiment includes an inverting amplifier circuit 36, a selector 40, a comparator 42, and memories 44 and 46.

The vertical output line 16 on each column of the pixel array unit 10 is connected to the input terminal of the inverting amplifier circuit 36 that is also the input node of the column circuit 30. The inverting amplifier circuit 36 amplifies a pixel signal (analog pixel signal) output from the pixel 12 via the vertical output line 16 at a predetermined gain and outputs the amplified signals. The output terminal of the inverting amplifier circuit 36 is connected to one of the two input terminals of the comparator 42. Note that it is not necessarily required to provide an inverting amplifier circuit 36, and the vertical output line 16 may be directly connected to the comparator 42. In such a case, the polarities of the reference signals VRAMPH and VRAMPL described below can be inverted.

Two input terminals of the selector 40 are connected to a reference signal generating circuit 52. A ramp signal having a larger slope is supplied as the reference signal VRAMPH to one of the two input terminals of the selector 40 from the reference signal generating circuit 52. Further, a ramp signal having a smaller slope is supplied as the reference signal VRAMPL to the other of the two input terminals of the selector 40 from the reference signal generating circuit 52. It is assumed that the slope of the reference signal VRAMPH is four times the slope of the reference signal VRAMPL in the following description. The output terminal of the selector 40 is connected to the other of the two input terminals of the comparator 42. The selector 40 selects the reference signal VRMAPI to be output to the comparator 42 out of the reference signals VRAMPH and VRAMPL. That is, the selector 40 functions as a switching unit to switch the AD conversion gain of the AD converter circuit.

The output terminal of the comparator 42 is connected to the memories 44 and 46, and the selector 40. The comparator 42 compares the level of the output signal VAMPO of the inverting amplifier circuit 36 with the level of the reference signal VRAMPI, and when the relationship of these signal levels is inverted, outputs a latch signal to the memory 44. Further, the comparator 42 compares the level of the output signal VAMPO of the inverting amplifier circuit 36 with the level of the reference signal VRAMPI and outputs a signal corresponding to the relationship of these signal levels to the selector 40 and the memory 46.

The counter 54 is connected to the memory 44. The memory 44 is connected to an output line 56a. The memory 46 is connected to an output line 56c. In response to the control signal from the horizontal scanning circuit 60, the memory 44 outputs the stored digital pixel signal to the signal processing unit 80 via the output line 56a. Further, in response to the control signal from the horizontal scanning circuit 60, the memory 46 outputs, to the signal processing unit 80 via the output line 56c, a signal corresponding to the result of comparison between the level of the stored output signal VAMPO of the inverting amplifier circuit 36 and the level of the reference signal VRAMPI.

Next, a method of driving the solid-state imaging device according to the present embodiment will be described by using FIG. 8. FIG. 8 is a timing diagram illustrating a method of driving the solid-state imaging device according to the present embodiment. FIG. 8 illustrates waveforms of the control signals PRES and PTX supplied to the pixels 12 belonging to the row to be read, the reference signals VRAMPL, VRAMPH, and VRAMPI, the output signal VAMPO of the inverting amplifier circuit 36, and the reference signal selected by the selector 40.

The control signals PRES and PTX are at a low level at time t20. In the subsequent period from the time t20 to time t21, the control signal PRES is controlled at a high level, and the reset transistor M2 is turned on. Thereby, the floating diffusion FD of the pixel 12 is reset to a voltage of the reset level corresponding to the voltage Vdd. The pixel signal (N-signal) corresponding to the reset voltage of the floating diffusion FD is output from the pixel 12 to the vertical output line 16 on each column. The inverting amplifier circuit 36 inverts and amplifies the N-signal output from the pixel 12 and outputs the inverted and amplified signal as an output signal VAMPO to one input terminal of the comparator 42. FIG. 8 illustrates the output signal VAMPO of the inverting amplifier circuit 36 by a dotted line and a dashed line. The dotted line indicates the output signal VAMPO of the inverting amplifier circuit 36 in low brightness, and the dashed line indicates the output signal VAMPO of the inverting amplifier circuit 36 in high brightness.

The subsequent period from time t22 to time t23 is a period (period NAD1) in which the N-signal is AD-converted at a first AD conversion gain by using the reference signal VRAMPH. At the time t22, the reference signal generating circuit 52 starts a ramp-up of the reference signals VRAMPH and VRAMPL, and the counter 54 starts counting. Before the time t22, the selector 40 has been set in a state of selecting the reference signal VRAMPH out of the reference signal VRAMPH and the reference signal VRAMPL. Therefore, the selector 40 selects the reference signal VRAMPH as the reference signal VRAMPI to be input to the other input terminal of the comparator 42. The comparator 42 starts comparison between the level of the output signal VAMPO and the level of the reference signal VRAMPI. When the level of the reference signal VRAMPI exceeds the level of the output signal VAMPO at time t22a, the output signal of the comparator 42 changes from a low level to a high level. By using this change in the output level of the comparator 42 as a latch signal, the memory 44 stores the count value indicated by the count signal COUNT that is being output from the counter 54 at that time as the digital value (digital pixel signal) of the pixel signal. This digital value stored in the memory 44 is denoted as ND1.

After the period NAD1 ends at the time t23, the reference signal generating circuit 52 resets the levels of the reference signals VRAMPH and VRAMPL to the initial state. Further, the selector 40 is set in a state of selecting the reference signal VRAMPL out of the reference signal VRAMPH and the reference signal VRAMPL.

The subsequent period from time t24 to time t25 is a period (period NAD2) in which the N-signal is AD-converted at a second AD conversion gain that is larger than the first AD conversion gain by using the reference signal VRAMPL. At the time t24, the reference signal generating circuit 52 starts a ramp-up of the reference signals VRAMPH and VRAMPL, and the counter 54 starts counting. The selector 40 selects the reference signal VRAMPL as the reference signal VRAMPI to be input to the other input terminal of the comparator 42. The comparator 42 starts comparison between the level of the output signal VAMPO and the level of the reference signal VRAMPI. When the level of the reference signal VRAMPI exceeds the level of the output signal VAMPO at time t24a, the output signal of the comparator 42 changes from a low level to a high level. By using this change in the output level of the comparator 42 as a latch signal, the memory 44 stores the count value indicated by the count signal COUNT that is being output from the counter 54 at that time as the digital value (digital pixel signal) of the pixel signal. This digital value stored in the memory 44 is denoted as ND2.

After the period NAD2 ends at the time t25, the reference signal generating circuit 52 resets the levels of the reference signals VRAMPH and VRAMPL to the initial state.

In the subsequent period from time t26 to time t27, the control signal PTX is controlled at a high level, and the transfer transistor M1 is turned on. Thereby, the signal charges accumulated in the photoelectric converter PD of the pixel 12 are transferred to the floating diffusion FD. The floating diffusion FD has a voltage corresponding to the amount of the signal charges transferred from the photoelectric converter PD. The pixel signal (S-signal) corresponding to the amount of the signal charges generated in the photoelectric converter PD is output from the pixel 12 to the vertical output line 16 on each column. The inverting amplifier circuit 36 inverts and amplifies the S-signal output from the pixel 12 and outputs the inverted and amplified signal as an output signal VAMPO to one input terminal of the comparator 42.

The subsequent period from time t28 to time t29 is a period (period SAD1) in which the S-signal is AD-converted at a second AD conversion gain by using the reference signal VRAMPL. At the time t28, the reference signal generating circuit 52 starts a ramp-up of the reference signals VRAMPH and VRAMPL, and the counter 54 starts counting. The selector 40 selects the reference signal VRAMPL as the reference signal VRAMPI to be input to the other input terminal of the comparator 42. The comparator 42 starts comparison between the level of the output signal VAMPO and the level of the reference signal VRAMPI.

Figure 8:
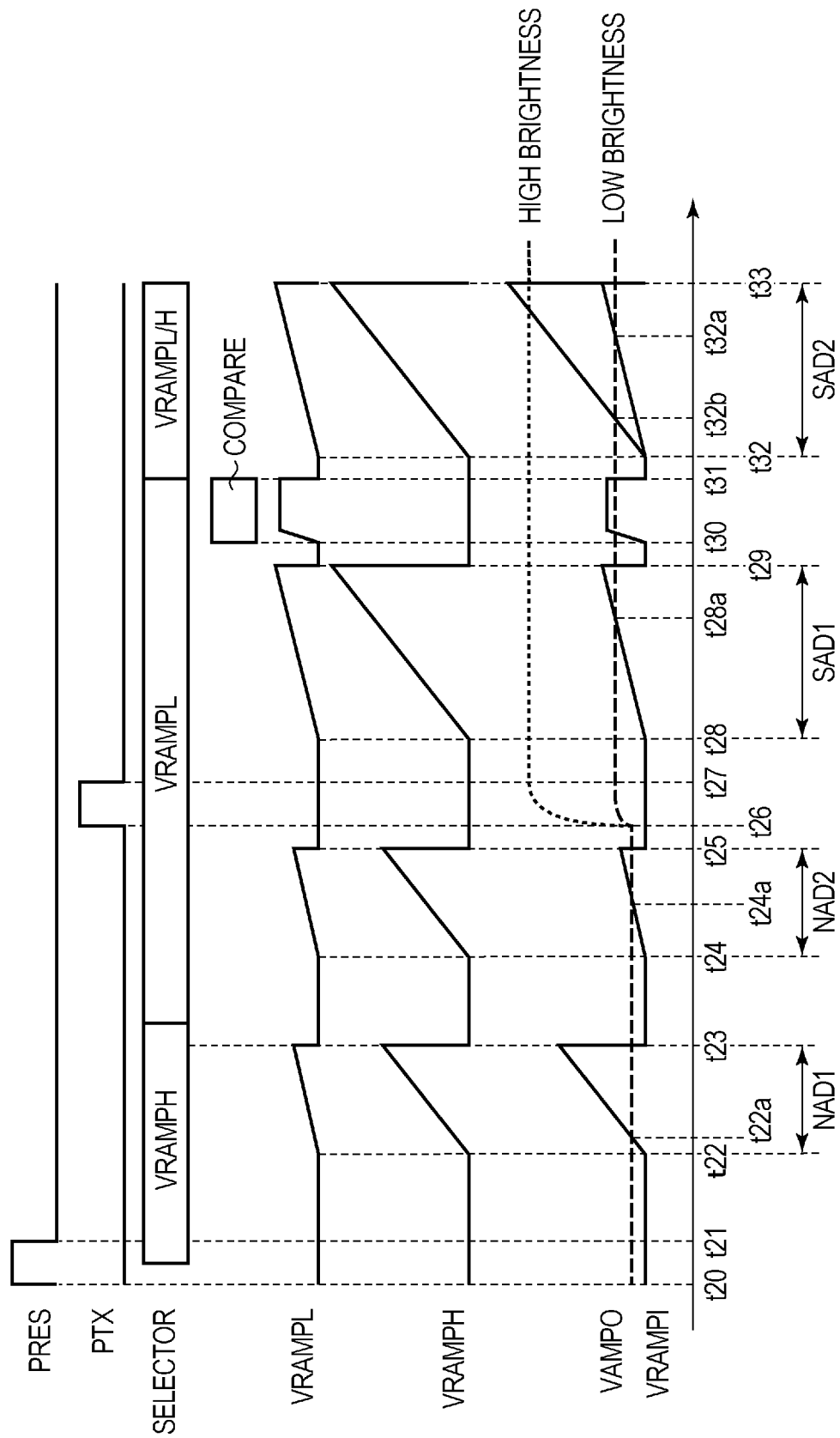
FIG. 8 is a timing diagram illustrating a method of driving the solid-state imaging device according to the third embodiment.

As is illustrated as the output signal VAMPO in low brightness in FIG. 8, when the level of the output signal VAMPO is lower than the level of the reference signal VRAMPI at the time t29, the level of the reference signal VRAMPI exceeds the level of the output signal VAMPO at time t28a, for example. Thereby, the output signal of the comparator 42 changes from a low level to a high level, and the memory 44 stores the count value indicated by the count signal COUNT that is being output from the counter 54 at that time as the digital value (digital pixel signal) of the pixel signal. This digital value stored in the memory 44 is denoted as SD1.

On the other hand, as is illustrated as the output signal VAMPO in high brightness in FIG. 8, when the level of the output signal VAMPO is higher than the level of the reference signal VRAMPI at the time t29, the level of the reference signal VRAMPI does not exceed the level of the output signal VAMPO. Thus, the output signal of the comparator 42 is not inverted, and the memory 44 does not store a digital value corresponding to the S-signal AD-converted by using the reference signal VRAMPL but stores the count value indicated as the count signal COUNT at the time t29, for example.

After the period SAD1 ends at the time t29, the reference signal generating circuit 52 resets the levels of the reference signals VRAMPH and VRAMPL to the initial state.

In the subsequent period from time t30 to time t31, the comparator 42 compares a reference signal of a threshold level supplied from the reference signal generating circuit 52 with the S-signal. First, from the time t30, the reference signal generating circuit 52 controls at least the level of the reference signal VRAMPL out of the reference signals VRAMPH and VRAMPL and sets the reference signal VRAMPL to any threshold level. This threshold level is set to a level which is approximately a quarter the signal range and slightly smaller than the amplitude of the reference signal VRAMPL in the period SAD1 in the same manner as in the cases of the first and second embodiments.

As the result of comparison by the comparator 42, when it is determined that the level of the S-signal is lower than the threshold level, the selector 40 holds the selection of the reference signal VRAMPL as the reference signal VRAMPI. When it is determined that the level of the S-signal is higher than the threshold level, the selector 40 selects the reference signal VRAMPH as the reference signal VRAMPI.

In the same manner as in the case of the first embodiment, the case where the selection of the reference signal VRAMPL is held is referred to as a first mode, and the case where the selection of the reference signal VRAMPH is switched is referred to as a second mode. The result of the comparison by the comparator 42 is stored in the memory 46 as a mode identification signal to identify which of the first mode or the second mode is applied.

The subsequent period from time t32 to time t33 is an AD conversion period (period SAD2) of the S-signal by using the reference signal VRAMPH or the reference signal VRAMPL. At the time t32, the reference signal generating circuit 52 starts a ramp-up of the reference signals VRAMPH and VRAMPL, and the counter 54 starts counting. Further, the comparator 42 starts comparison between the level of the output signal VAMPO and the level of the reference signal VRAMPI.

In the case of the first mode, the level of the S-signal is compared with the level of the reference signal VRAMPL, and the count value indicated by the count signal COUNT at time t32a when the relationship of these levels is inverted is stored in the memory 44 as the digital value SD2. In the case of the second mode, the level of the S-signal is compared with the level of the reference signal VRAMPH, and the count value indicated by the count signal COUNT at time t32b when the relationship of these levels is inverted is stored in the memory 44 as the digital value SD2.

After the time t33 when the period SAD 2 ends, in response to the control signal from the horizontal scanning circuit 60, the digital output signals of the digital values ND1, ND2, SD1, and SD2 stored in the memory 44 are output to the signal processing unit 80 on the post-stage via the output line 56a. Similarly, in response to the control signal from the horizontal scanning circuit 60, the mode identification signal stored in the memory 44 is output to the signal processing unit 80 on the post-stage via the output line 56c. The subsequent operation is the same as that of the first embodiment.

Note that, although the reference signal of the threshold level generated in the reference signal generating circuit 52 is compared with the S-signal in the present embodiment, comparison may be performed by using the digital value SD1 that is an AD conversion result of the period SAD1 in the same manner as the second embodiment.

As described above, according to the present embodiment, it is possible to reduce noise in low brightness when reading out a single pixel signal with multiple types of gains.

Fourth Embodiment

A solid-state imaging device and a method of driving the same according to a fourth embodiment of the present invention will be described with reference to FIG. 9 and FIG. 10. Components similar to those of the solid-state imaging devices according to the first to third embodiments are labeled with the same reference, and the description thereof will be omitted or simplified.

In the first to third embodiments, readout of pixel signals at different gains is performed in a time division manner by using the column circuit 30 including a single AD conversion unit. In the present embodiment, a case where pixel signals of different gains are read out in parallel by using two AD converter circuits provided in the column circuit 30 will be described.

First, the structure of the solid-state imaging device according to the present embodiment will be described by using FIG. 9. FIG. 9 is a circuit diagram illustrating a configuration example of a column circuit of the solid-state imaging device according to the present embodiment.

Figure 9:
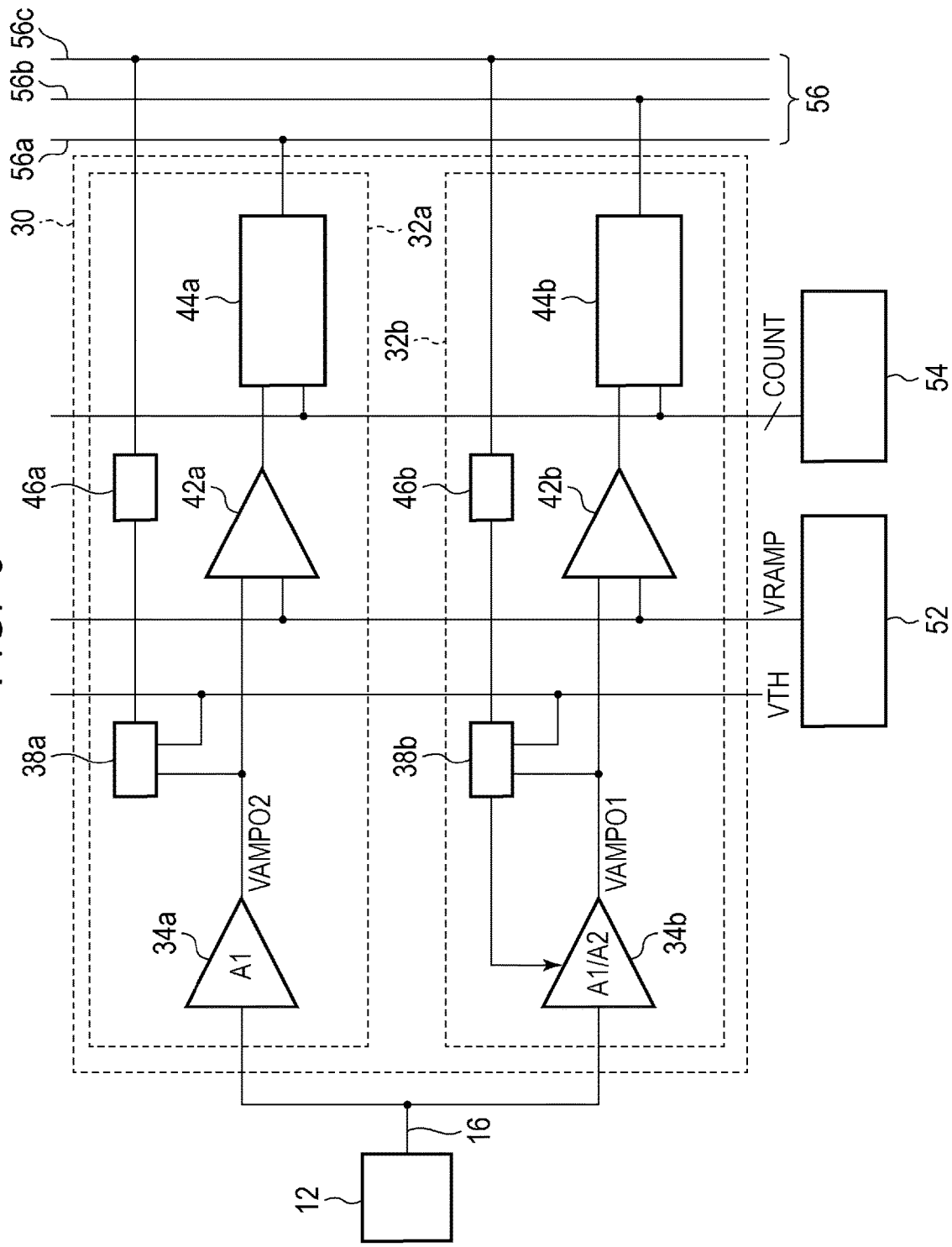
FIG. 9 is a circuit diagram illustrating a configuration example of a column circuit of a solid-state imaging device according to a fourth embodiment.
Figure 10:
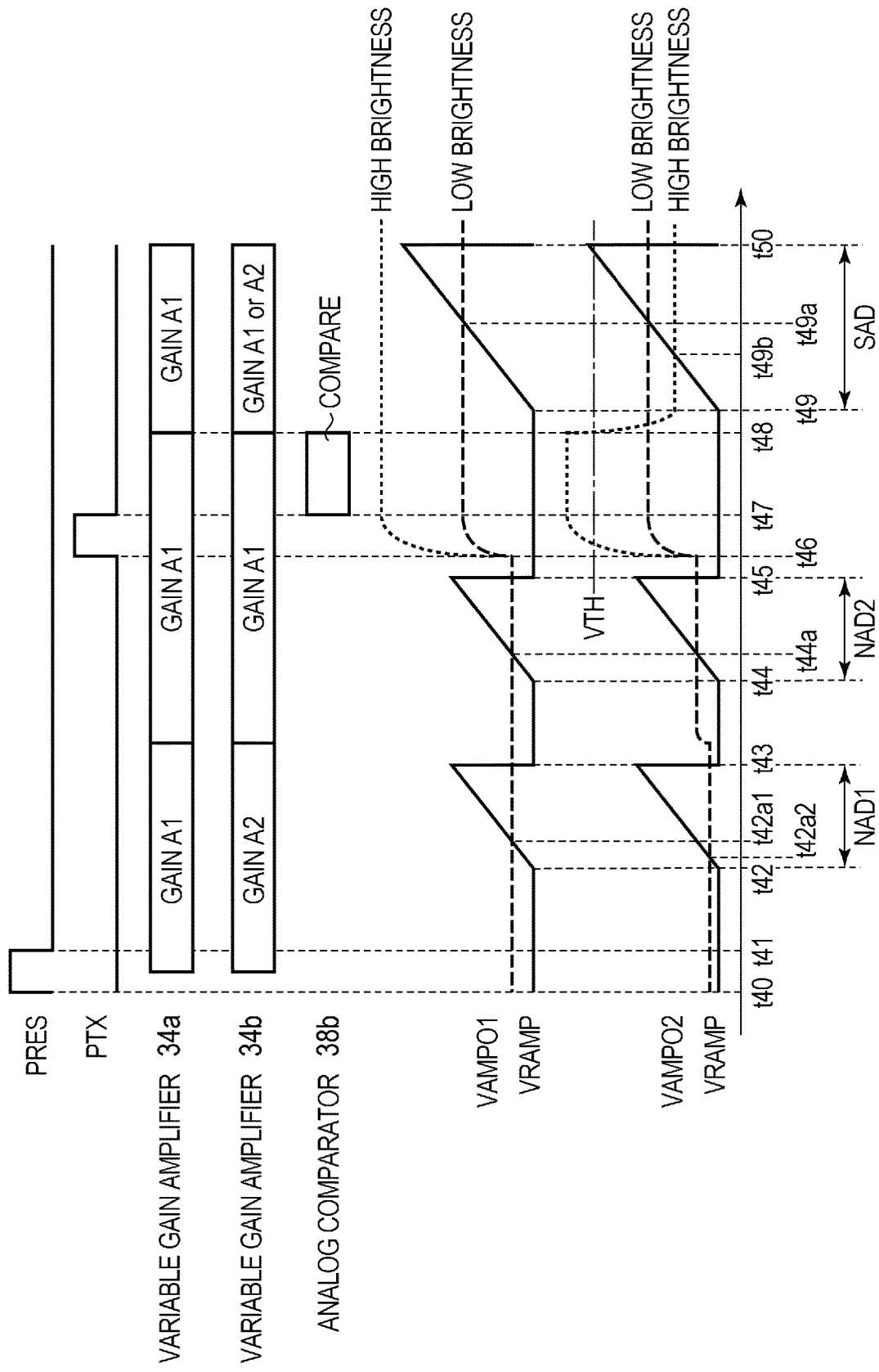
FIG. 10 is a timing diagram illustrating a method of driving the solid-state imaging device according to the fourth embodiment.

The column circuit 30 according to the present embodiment includes a readout circuit 32a and a readout circuit 32b as illustrated in FIG. 9. Each of the readout circuit 32a and the readout circuit 32b has the same configuration as the column circuit 30 of the solid-state imaging device according to the first embodiment.

That is, the readout circuit 32a includes a variable amplifier circuit 34a, an analog comparator unit 38a, a comparator 42a, and memories 44a and 46a. Further, the readout circuit 32b includes a variable amplifier circuit 34b, an analog comparator unit 38b, a comparator 42b, and memories 44b and 46b. In the readout circuit 32a and the readout circuit 32b, the connection relationship of each unit is the same as that of the column circuit 30 of the solid-state imaging device according to the first embodiment.

Note that, in the drive method of the present embodiment described later, since the amplification factor of the variable amplifier circuit 34a of the readout circuit 32a is fixed to the gain A1 (four-fold), it is not necessarily required to provide the analog comparator unit 38a and the memory 46a of the readout circuit 32a. FIG. 9 illustrates an example in which the analog comparator unit 38a and the memory 46a are provided also in the readout circuit 32a as a configuration example taking equality to the readout circuit 32b on the element layout into consideration.

Next, a method of driving the solid-state imaging device according to the present embodiment will be described by using FIG. 10. FIG. 10 is a timing diagram illustrating the method of driving the solid-state imaging device according to the present embodiment. FIG. 10 illustrates waveforms of the control signals PRES and PTX supplied to the pixels 12 belonging to the row to be read out, the reference signals VRAMP, the output signal VAMPO1 of the variable amplifier circuit 34a, and the output signal VAMPO2 of the variable amplifier circuit 34b. Further, FIG. 10 illustrates a setting value of the amplification factor of the variable amplifier circuit 34a in the readout circuit 32a, a setting value of the amplification factor of the variable amplifier circuit 34b in the readout circuit 32b, and an operation period of the analog comparator unit 38b.

The control signals PRES and PTX are at a low level at time t40. In the subsequent period from the time t40 to time t41, the control signal PRES is controlled at a high level, and the reset transistor M2 is turned on. Thereby, the floating diffusion FD of the pixel 12 is reset to the voltage of the reset level corresponding to the voltage Vdd. A pixel signal corresponding to the reset voltage of the floating diffusion FD is output from the pixel 12 to the vertical output line 16 on each column.

At this time, the amplification factor of the variable amplifier circuit 34a is set to the gain A1 (four-fold), and the pixel signal (N-signal) output from the pixel 12 is amplified at the gain A1-fold in the variable amplifier circuit 34a. Further, the amplification factor of the variable amplifier circuit 34b is set to the gain A2 (one-fold), and the pixel signal (N-signal) output from the pixel 12 is amplified at the gain A2-fold in the variable amplifier circuit 34b. FIG. 10 illustrates the output signals VAMPO1 and VAMPO2 of the variable amplifier circuits 34a and 34b by dotted lines and dashed lines, respectively. The dotted lines indicate the output signals VAMPO1 and VAMPO2 of the variable amplifier circuits 34a and 34b in low brightness, and the dashed lines indicate the output signals VAMPO1 and VAMPO2 of the variable amplifier circuits 34a and 34b in high brightness.

The subsequent period from time t42 to time t43 is an AD conversion period (period NAD1) of the N-signal. At the time t42, the reference signal generating circuit 52 starts a ramp-up of the reference signal VRAMP, and the counter 54 starts counting. Further, the comparator 42a starts comparison between the level of the output signal VAMPO1 and the level of the reference signal VRAMP, and the comparator 42b starts comparison between the level of the output signal VAMPO2 and the level of the reference signal VRAMP.

When the level of the reference signal VRAMP exceeds the level of the output signal VAMPO1 at time t42a1, the output signal of the comparator 42a changes from a low level to a high level. By using this change in the output level of the comparator 42a as a latch signal, the memory 44a stores the count value indicated by the count signal COUNT that is being output from the counter 54 at that time as the digital value (digital pixel signal) of the pixel signal. This digital value stored in the memory 44a is denoted as ND1a.

Similarly, when the level of the reference signal VRAMP exceeds the level of the output signal VAMPO2 at time t42a2, the output signal of the comparator 42b changes from a low level to a high level. By using this change in the output level of the comparator 42b as a latch signal, the memory 44b stores the count value indicated by the count signal COUNT that is being output from the counter 54 at that time as the digital value (digital pixel signal) of the pixel signal. This digital value stored in the memory 44b is denoted as ND1b.

After the period NAD1 ends at the time t43, the reference signal generating circuit 52 resets the level of the reference signal VRAMP to the initial state. Further, the amplification factor of the variable amplifier circuit 34b is switched from the gain A2 to the gain A1 (four-fold). Thereby, the pixel signal (N-signal) output from the pixel 12 is amplified at the gain A1-fold in the variable amplifier circuit 34b, and the output signal VAMPO2 increases.

The subsequent period from time t44 to time t45 is an AD conversion period (period NAD2) of the N-signal. At the time t44, the reference signal generating circuit 52 starts a ramp-up of the reference signal VRAMP, and the counter 54 starts counting. Further, the comparator 42a starts comparison between the level of the output signal VAMPO1 and the level of the reference signal VRAMP, and the comparator 42b starts comparison between the level of the output signal VAMPO2 and the level of the reference signal VRAMP.

When the level of the reference signal VRAMP exceeds the level of the output signal VAMPO1 at time t44a, the output signal of the comparator 42a changes from a low level to a high level. By using this change in the output level of the comparator 42a as a latch signal, the memory 44a stores the count value indicated by the count signal COUNT that is being output from the counter 54 at that time as the digital value (digital pixel signal) of the pixel signal. This digital value stored in the memory 44a is denoted as ND2a.

Similarly, when the level of the reference signal VRAMP exceeds the level of the output signal VAMPO2 at the time t44a, the output signal of the comparator 42b changes from a low level to a high level. By using this change in the output level of the comparator 42b as a latch signal, the memory 44b stores the count value indicated by the count signal COUNT that is being output from the counter 54 at that time as the digital value (digital pixel signal) of the pixel signal. This digital value stored in the memory 44b is denoted as ND2b.

While the digital value ND2a and the digital value ND2b are the values indicated by the count signal COUNT at substantially the same time, there may be a difference between both the values due to the influence of variations between the elements of the readout circuits 32a and 32b and the like.

After the period NAD2 ends at the time t45, the reference signal generating circuit 52 resets the level of the reference signal VRAMP to the initial state.

In the subsequent period from time t46 to time t47, the control signal PTX is controlled at a high level, and the transfer transistor M1 is turned on. Thereby, the signal charges accumulated in the photoelectric converter PD of the pixel 12 are transferred to the floating diffusion FD. The floating diffusion FD has a voltage corresponding to the amount of the signal charges transferred from the photoelectric converter PD. The pixel signal corresponding to the amount of the signal charges generated in the photoelectric converter PD is output from the pixel 12 to the vertical output line 16 on each column. At this time, the amplification factors of the variable amplifier circuits 34a and 34b are set to the gain A1 (four-fold), and the pixel signals (S-signals) output from the pixel 12 are amplified at the gain A1-fold in the variable amplifier circuits 34a and 34b.

In the subsequent period from the time t47 to time t48, the analog comparator unit 38b of the readout circuit 32b compares the threshold voltage VTH with the output signal VAMPO2 of the variable amplifier circuit 34b. When the output signal VAMPO2 corresponds to high brightness that is higher than the threshold voltage VTH, the amplification factor of the variable amplifier circuit 34b is switched from the gain A1 to the gain A2. Thereby, the output signal VAMPO2 is reduced as illustrated by the dotted line in FIG. 10. When the output signal VAMPO2 corresponds to low brightness that is lower than the threshold voltage VTH, the amplification factor of the variable amplifier circuit 34b is maintained at the gain A1.

The subsequent period from time t49 to time t50 is an AD conversion period (period SAD) of the S-signal. At the time t49, the reference signal generating circuit 52 starts a ramp-up of the reference signal VRAMP, and the counter 54 starts counting. Further, the comparator 42a starts comparison between the level of the output signal VAMPO1 and the level of the reference signal VRAMP, and the comparator 42b starts comparison between the level of the output signal VAMPO2 and the level of the reference signal VRAMP.

In the readout circuit 32a in low brightness, the level of the reference signal VRAMP exceeds the level of the output signal VAMPO1 at time t49a, and the output signal of the comparator 42a changes from a low level to a high level. By using this change in the output level of the comparator 42a as a latch signal, the memory 44a stores the count value indicated by the count signal COUNT that is being output from the counter 54 at that time as the digital value (digital pixel signal) of the pixel signal. This digital value stored in the memory 44a is denoted as SD1.

Similarly, in the readout circuit 32b, the level of the reference signal VRAMP exceeds the level of the output signal VAMPO2 at the time t49a, and the output signal of the comparator 42b changes from a low level to a high level. By using this change in the output level of the comparator 42b as a latch signal, the memory 44b stores the count value indicated by the count signal COUNT that is being output from the counter 54 at that time as the digital value (digital pixel signal) of the pixel signal. This digital value stored in the memory 44b is denoted as SD2.

On the other hand, in the readout circuit 32a in high brightness, since the level of the output signal VAMPO1 of the variable amplifier circuit 34a exceeds the level of the reference signal VRAMP at the time t50, the level of the reference signal VRAMP does not exceed the level of the output signal VAMPO1. Thus, the output signal of the comparator 42a is not inverted, and the memory 44a does not store a digital value corresponding to the S-signal amplified at A1-fold. The memory 44a stores the count value indicated by the count signal COUNT at the time t50, for example.

Further, in the readout circuit 32b, the level of the reference signal VRAMP exceeds the level of the output signal VAMPO2 at the time t49a, and the output signal of the comparator 42b changes from a low level to a high level. By using this change in the output level of the comparator 42b as a latch signal, the memory 44b stores the count value indicated by the count signal COUNT that is being output from the counter 54 at that time as the digital value (digital pixel signal) of the pixel signal. This digital value stored in the memory 44b is denoted as SD2.

After the time t50 when the period SAD ends, in response to the control signal from the horizontal scanning circuit 60, the digital output signals of the digital values ND1a, ND2a, SD1, and SD2 stored in the memory 44a are output to the signal processing unit 80 on the post-stage via the output line 56a. Similarly, in response to the control signal from the horizontal scanning circuit 60, the digital output signals of the digital values ND1b, ND2b, SD1, and SD2 stored in the memory 44b are output to the signal processing unit 80 on the post-stage via the output line 56b. Further, in response to the control signal from the horizontal scanning circuit 60, the mode identification signal stored in the memory 46b is output to the signal processing unit 80 on the post-stage via the output line 56c.

In the signal processing unit 80, a CDS process is performed by using the digital values ND1a, ND1b, ND2a, ND2b, SD1, and SD2 and the mode identification signal output from the column circuit 30.

When the mode identification signal indicates the first mode, the output signal OUT1 can be calculated from any of the following Equations.

$$OUT1 = SD1 - ND1a$$

$$OUT1 = SD1 - ND2a, \text{ or}$$

$$OUT1 = SD1 - (ND1a + ND2a)/2$$

Since the N-signal is read out twice at the same gain in the first mode, either the digital value ND1a or the digital value ND2a can be used to calculate the output signal OUT1. Further, it is possible to further reduce noise by using an average value of the digital value ND1a and the digital value ND2a.

Further, the output signal OUT2 can be calculated from the following Equation.

$$OUT2 = SD2 - ND2b$$

On the other hand, when the mode identification signal indicates the second mode, the output signal OUT1 can be calculated from any of the following Equations.

$$OUT1 = SD1 - ND1a, \text{ or}$$

$$OUT1 = SD1 - ND2a$$

Further, the output signal OUT2 can be calculated from the following Equation.

$$OUT2 = 4 \times (SD2 - ND1b)$$

As described in the first embodiment, a CDS process of the output signal OUT1 in the second mode may be omitted. The subsequent image processing method is the same as that of the case of the first embodiment.

As described above, according to the present embodiment, it is possible to reduce noise in low brightness when reading out a single pixel signal with multiple types of gains.

Fifth Embodiment

Figure 11:
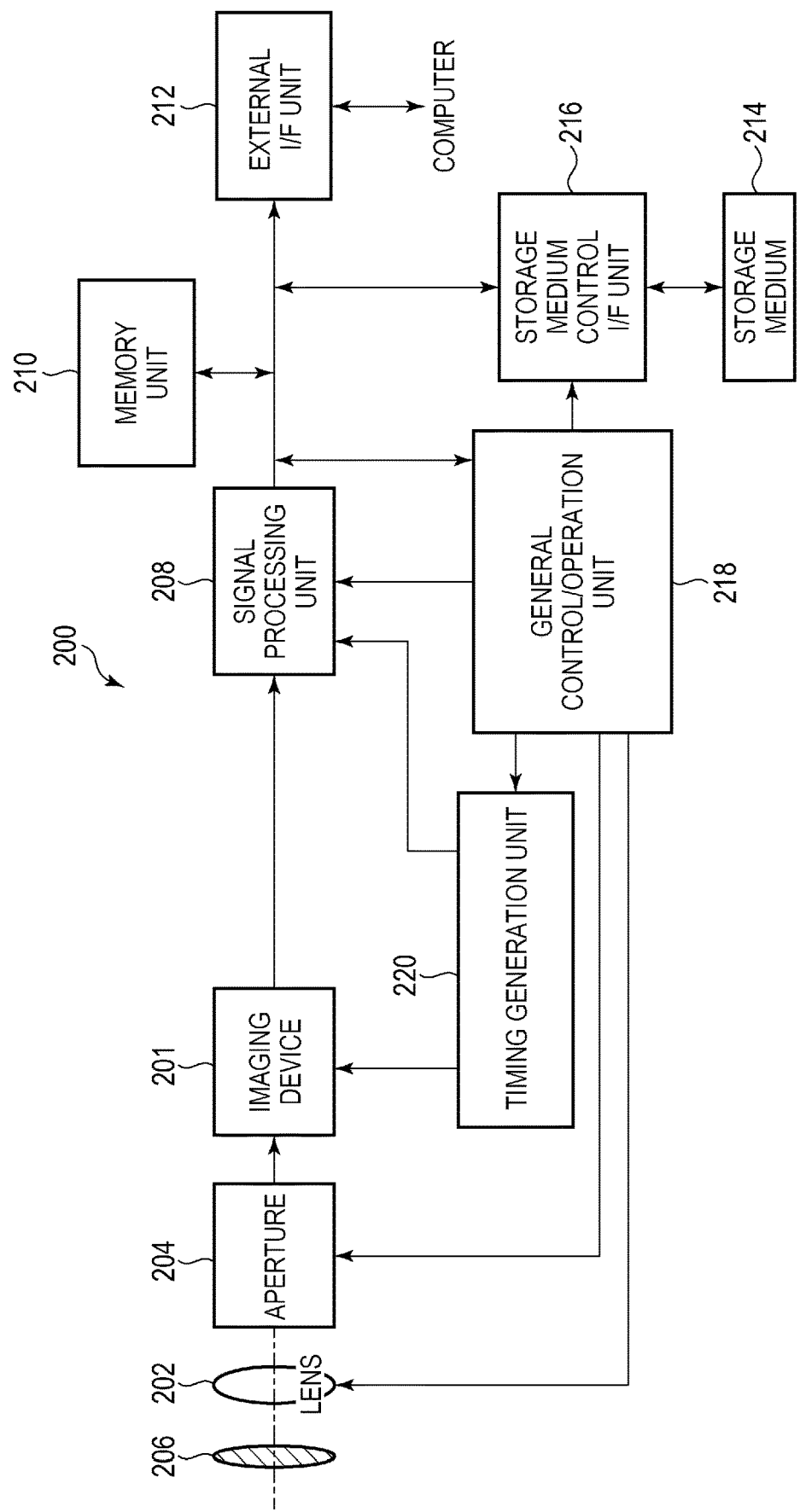
FIG. 11 is a block diagram illustrating a general configuration of an imaging system according to a fifth embodiment of the present invention.

An imaging system according to a fifth embodiment of the present invention will be described with reference to FIG. 11. FIG. 11 is a block diagram illustrating a general configuration of an imaging system according to the present embodiment.

An imaging system 200 of the present embodiment includes an imaging device 201 to which the configuration of the solid-state imaging device 100 described in any of the first to fourth embodiments is applied. Specific examples of the imaging system 200 may include a digital still camera, a digital camcorder, a surveillance camera, and the like. FIG. 11 illustrates a configuration example of a digital still camera including the imaging device 201 to which the configuration of the solid-state imaging device 100 described in the above embodiments is applied as an example.

The imaging system 200 illustrated as an example in FIG. 11 includes the imaging device 201, a lens 202 that captures an optical image of an object onto the imaging device 201, an aperture 204 for changing a light amount passing through the lens 202, and a barrier 206 for protecting the lens 202. The lens 202 and the aperture 204 form an optical system that converges a light onto the imaging device 201.

The imaging system 200 further includes a signal processing unit 208 that processes an output signal output from the imaging device 201. The signal processing unit 208 may have at least a part of the functions of the signal processing unit 80 in the solid-state imaging device 100 described in the above embodiments. The signal processing unit 208 performs an operation of signal processing for performing various correction and compression on an input signal, if necessary, to output the signal. For example, the signal processing unit 208 performs on an input signal, predetermined image processing such as a conversion process that converts pixel output signals of RGB to Y, Cb, Cr color space, gamma correction, or the like.

The imaging system 200 further includes a memory unit 210 for temporarily storing image data therein and an external interface unit (external I/F unit) 212 for communicating with an external computer or the like. The imaging system 200 further includes a storage medium 214 such as a semiconductor memory used for performing storage or readout of imaging data and a storage medium control interface unit (storage medium control I/F unit) 216 used for performing storage or readout on the storage medium 214. Note that the storage medium 214 may be embedded in the imaging system 200 or may be removable.

The imaging system 200 further includes a general control/operation unit 218 that performs various computation and controls the entire digital still camera and a timing generation unit 220 that outputs various timing signals to the imaging device 201 and the signal processing unit 208. The timing signal or the like may be input from the outside, and the imaging system 200 may have at least the imaging device 201 and the signal processing unit 208 that processes an output signal output from the imaging device 201. The general control/operation unit 218 and the timing generation unit 220 may be configured to perform some or all of control functions of the imaging device 201.

The imaging device 201 outputs predetermined signals corresponding to the configuration thereof, for example, digital output signals of the digital values ND1, ND2, SD1, SD2, and SD, the output signal OUT1, OUT2, an image signal, a mode identification signal, and the like to the signal processing unit 208. The signal processing unit 208 performs predetermined signal processing on a signal output from the imaging device 201 and generates an image. The image generated in the signal processing unit 208 is stored in the storage medium 214, for example. Further, the image generated in the signal processing unit 208 is displayed as a moving image or a static image on a monitor formed of a liquid crystal display or the like. An image stored in the storage medium 214 can be hard-copied by a printer or the like.

By forming an imaging system using the imaging device of each embodiment described above, it is possible to realize an imaging system capable of acquiring a higher quality image.

Sixth Embodiment

Figure 12A:
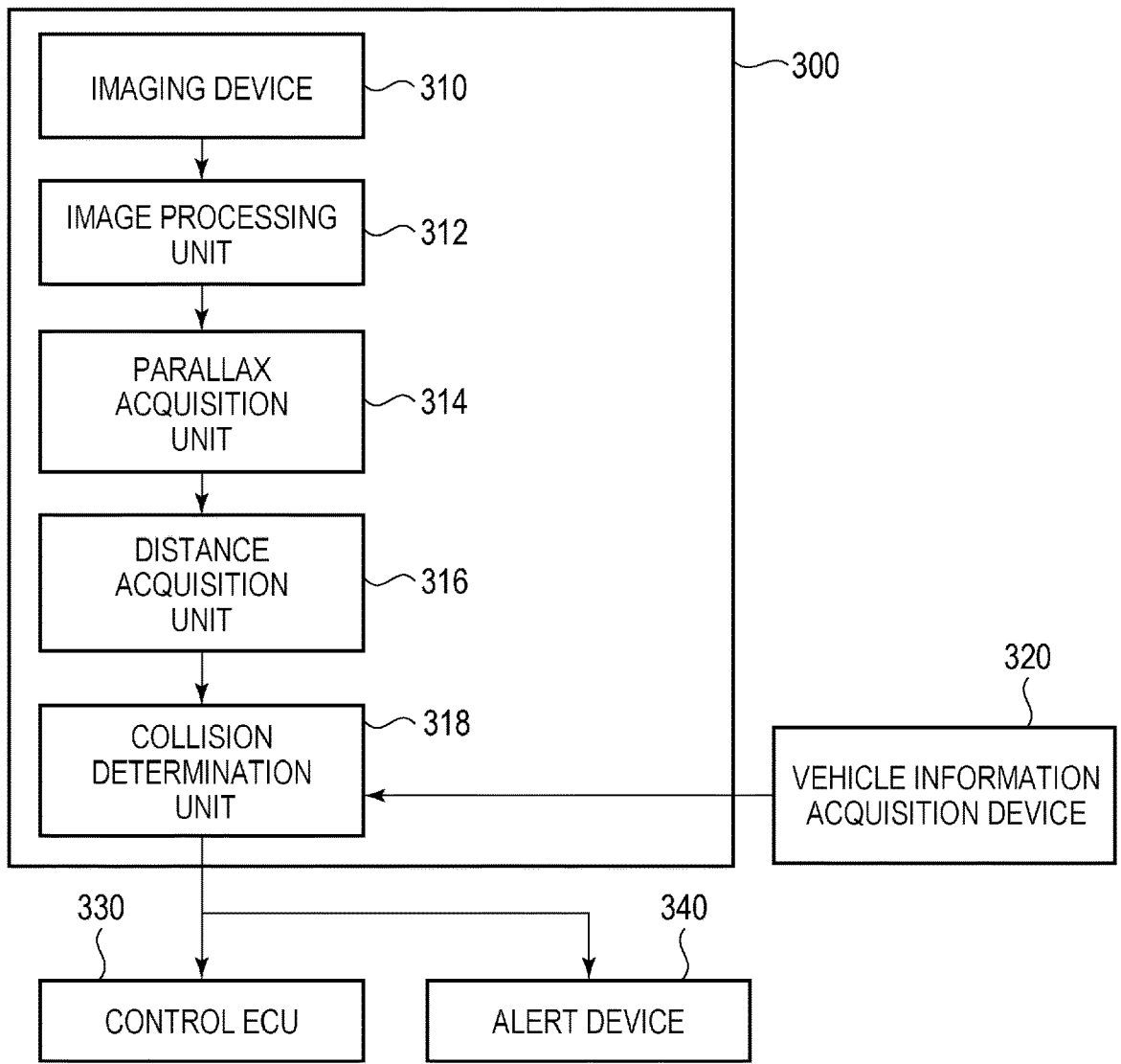
FIG. 12A is a diagram illustrating a configuration example of an imaging system according to a sixth embodiment of the present invention.
Figure 12B:
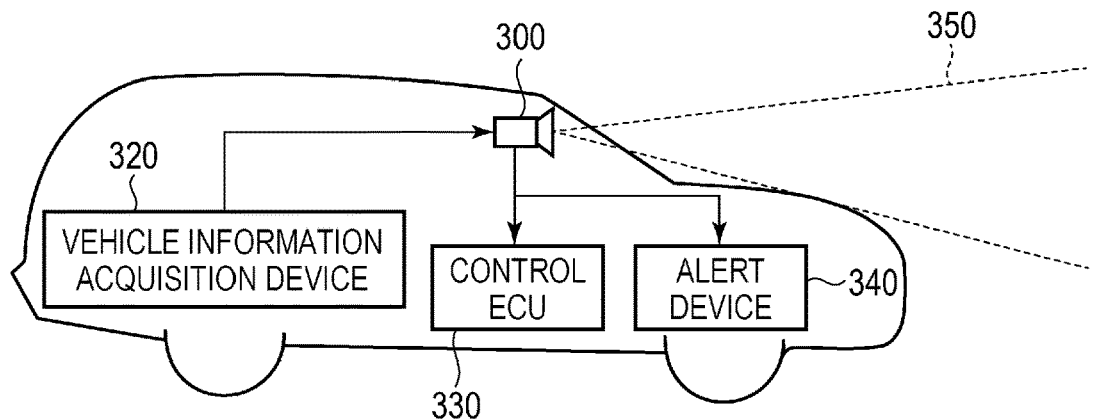
FIG. 12B is a diagram illustrating a configuration example of a movable object according to the sixth embodiment of the present invention.

An imaging system and a movable object according to a sixth embodiment of the present invention will be described with reference to FIG. 12A and FIG. 12B. FIG. 12A is a diagram illustrating a configuration of an imaging system according to the present embodiment. FIG. 12B is a diagram illustrating a configuration of a movable object according to the present embodiment.

FIG. 12A illustrates an example of an imaging system 300 related to an on-vehicle camera. The imaging system 300 includes an imaging device 310. The imaging device 310 is any of the solid-state imaging devices 100 described in each of the above embodiments. The imaging system 300 includes an image processing unit 312 that performs image processing on a plurality of image data acquired by the imaging device 310 and a parallax acquisition unit 314 that calculates a parallax (a phase difference of parallax images) from the plurality of image data acquired by the imaging device 310. Further, the imaging system 300 includes a distance acquisition unit 316 that calculates a distance to an object based on the calculated parallax and a collision determination unit 318 that determines whether or not there is a collision possibility based on the calculated distance. Here, the parallax acquisition unit 314 and the distance acquisition unit 316 are an example of a distance information acquisition unit that acquires distance information on the distance to an object. That is, the distance information is information on a parallax, a defocus amount, a distance to an object, or the like. The collision determination unit 318 may use any of the distance information to determine the collision possibility. The distance information acquisition unit may be implemented by dedicatedly designed hardware or may be implemented by a software module. Further, the distance information acquisition unit may be implemented by a Field Programmable Gate Array (FPGA), an Application Specific Integrated Circuit (ASIC), or the like, or may be implemented by combination thereof.

The imaging system 300 is connected to a vehicle information acquisition device 320 and can acquire vehicle information such as a vehicle speed, a yaw rate, a steering angle, or the like. Further, the imaging system 300 is connected to a control ECU 330, which is a control device that outputs a control signal for causing a vehicle to generate braking force based on a determination result by the collision determination unit 318. That is, the control ECU 330 is an example of a movable object control unit for controlling a movable object based on the distance information. Further, the imaging system 300 is also connected to an alert device 340 that issues an alert to the driver based on a determination result by the collision determination unit 318. For example, when the collision probability is high as the determination result of the collision determination unit 318, the control ECU 330 performs vehicle control to avoid a collision or reduce damage by applying a brake, pushing back an accelerator, suppressing engine power, or the like. The alert device 340 alerts a user by sounding an alert such as a sound, displaying alert information on a display of a car navigation system or the like, providing vibration to a seat belt or a steering wheel, or the like.

In the present embodiment, an area around a vehicle, for example, a front area or a rear area is captured by using the imaging system 300. FIG. 12B illustrates the imaging system 300 in a case of capturing a front area of a vehicle (a capturing area 350). The vehicle information acquisition device 320 transmits instructions to cause the imaging system 300 to operate and perform capturing. The use of the solid-state imaging device 100 of each embodiment described above as the imaging device 310 enables the imaging system 300 of the present embodiment to further improve the ranging accuracy.

Although an example of control for avoiding a collision to another vehicle has been described in the description above, it is applicable to automatic driving control for following another vehicle, automatic driving control for not going out of a traffic lane, or the like. Furthermore, the imaging system is not limited to a vehicle such as the subject vehicle and can be applied to a movable object (moving apparatus) such as a ship, an airplane, or an industrial robot, for example. In addition, the imaging system can be widely applied to a device which utilizes object recognition, such as an intelligent transportation system (ITS), without being limited to movable objects.

Modified Embodiment

The present invention is not limited to the above-described embodiments, and various modifications are possible.

For example, an example in which a part of the configuration of any of the embodiments is added to another embodiment or an example in which a part of the configuration of any of the embodiments is replaced with a part of the configuration of another embodiment is one of the embodiments of the present invention. For example, in the fourth embodiment described above, although an example in which the readout circuit 32a and the readout circuit 32b are each formed of the column circuit 30 of the first embodiment is illustrated, the readout circuit 32a and the readout circuit 32b may also be formed of the column circuit 30 of the third embodiment illustrated in FIG. 7. Pixel signals can also be read out with two types of gains by using the two reference signals VRAMPH and VRAMPL having different slopes.

Further, a circuit configuration of the pixel 12 is not limited to that illustrated in FIG. 2 and can be changed if necessary. For example, each of the pixels 12 may have a plurality of photoelectric converters PD.

Further, the imaging systems illustrated in the fifth and sixth embodiments are an example of imaging systems to which the imaging device of the present invention may be applied, the imaging system to which the imaging device of the present invention can be applied is not limited to the configuration illustrated in FIG. 11 and FIG. 12A.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-193530, filed Oct. 3, 2017, which is hereby incorporated by reference herein in its entirety.

What is claimed is:

1. A solid-state imaging device comprising:
   a pixel array unit in which a plurality of pixels each including a photoelectric converter are arranged over a plurality of rows and a plurality of columns;
   a plurality of output lines each connected to the pixels arranged on a corresponding column of the plurality of columns; and
   a plurality of column circuits each connected to a corresponding output line of the plurality of output lines,
   wherein each of the plurality of column circuits is configured to operate in a first mode and a second mode,
   in the first mode, the column circuit receives as an input signal a single signal based on charges generated in the photoelectric converter of at least one pixel connected to the corresponding output line, amplifies the single signal at a common gain to generate a first pixel signal and a second pixel signal, and output a greater number of signals including the first pixel signal and the second pixel signal than the input signal, and
   in the second mode, the column circuit receives as an input signal the single signal, amplifies the single signal at a first gain to generate a first pixel signal, amplifies the single signal at a second gain that is lower than the first gain to generate a second pixel signal, and outputs a greater number of signals including the first pixel signal and the second pixel signal than the input signal,
   wherein each of the column circuits includes a variable amplifier circuit whose amplification factor is variable,
   wherein each of the column circuits amplifies the signal at the first gain or the second gain by switching the amplification factor of the variable amplifier circuit,
   wherein each of the column circuits further includes:
      an AD converter circuit that converts an analog signal to a digital signal; and
      a comparator unit that compares a digital value of the signal output from the AD converter circuit with a predetermined threshold value, and
   wherein each of the column circuits,
      when a digital value of the signal amplified at the first gain by the variable amplifier circuit is lower than the threshold value, amplifies the signal to be output as the second pixel signal at the first gain by the variable amplifier circuit, and
      when a digital value of the signal amplified at the first gain by the variable amplifier circuit is higher than the threshold value, amplifies the signal to be output as the second pixel signal at the second gain by the variable amplifier circuit.

2. The solid-state imaging device according to claim 1, wherein the comparator unit compares a value of a part of a plurality of bits of a digital value of the signal with a value of the part of a plurality of bits of the threshold value.

3. The solid-state imaging device according to claim 1, wherein each of the column circuits includes
   a first readout circuit that amplifies the signal to be output as the first pixel signal at the first gain in the first mode and the second mode; and
   a second readout circuit that amplifies the signal to be output as the second pixel signal at the first gain in the first mode and amplifies the signal at the second gain in the second mode.

4. The solid-state imaging device according to claim 1, wherein each of the column circuits outputs the first pixel signal and the second pixel signal in a time division manner.

5. The solid-state imaging device according to claim 4, wherein each of the column circuits outputs the second pixel signal after outputting the first pixel signal when operating in the second mode.

6. The solid-state imaging device according to claim 1, wherein each of the column circuits outputs a mode identification signal indicating which of the first mode and the second mode has been applied to operation.

7. The solid-state imaging device according to claim 1, wherein each of the column circuits switches the first mode and the second mode in response to an external control signal.

8. The solid-state imaging device according to claim 1, wherein each of the column circuits is further configured such that a signal based on a reset voltage of the pixel is amplified at the first gain to output a first reset signal and is amplified at the second gain to output a second reset signal.

9. The solid-state imaging device according to claim 8, further comprising a signal processing unit that processes a signal output from each of the column circuits,
wherein the signal processing unit is configured to,
when each of the column circuits operates in the first mode, output a difference between the first pixel signal and the first reset signal as a first output signal and a difference between the second pixel signal and the first reset signal as a second output signal, and
when each of the column circuits operates in the second mode, output a difference between the first pixel signal and the first reset signal as a first output signal and output a second output signal obtained by multiplying a difference between the second pixel signal and the first reset signal by a ratio of the second gain to the first gain.

10. The solid-state imaging device according to claim 9, wherein the signal processing unit,
when each of the column circuits operates in the first mode, generates an image signal by applying an averaging process to the first output signal and the second output signal, and
when each of the column circuits operates in the second mode, sets the second output signal as an image signal.

11. The solid-state imaging device according to claim 10, wherein, when each of the column circuits operates in the first mode, the signal processing unit generates the image signal by weighting and averaging the first output signal and the second output signal such that weighting to the second output signal is larger as signal levels of the first output signal and the second output signal are closer to a predetermined threshold level at which the first mode and the second mode are switched.

12. An imaging system comprising:
the solid-state imaging device according to claim 1; and
a signal processing unit that processes a signal output from the solid-state imaging device,
wherein the signal processing unit is configured to,
when each of the column circuits operates in the first mode, output a first output signal based on the first pixel signal and a second output signal based on the second pixel signal, and
when each of the column circuits operates in the second mode, output a first output signal based on the first pixel signal and a second output signal obtained by multiplying a signal based on the second pixel signal by a ratio of the second gain to the first gain.

13. The imaging system according to claim 12, wherein the signal processing unit,
when each of the column circuits operates in the first mode, generates an image signal by applying an averaging process to the first output signal and the second output signal, and
when each of the column circuits operates in the second mode, sets the second output signal as an image signal.

14. A movable object comprising:
the solid-state imaging device according to claim 1;
a distance information acquisition unit that acquires distance information on a distance to an object, from a parallax image based on signals output from the pixel of the solid-state imaging device; and
a control unit that controls the movable object based on the distance information.

15. A solid-state imaging device comprising:
a pixel array unit in which a plurality of pixels each including a photoelectric converter are arranged over a plurality of rows and a plurality of columns;
a plurality of output lines each connected to the pixels arranged on a corresponding column of the plurality of columns;
a plurality of column circuits each connected to a corresponding output line of the plurality of output lines; and
a signal processing unit that processes a signal output from each of the column circuits,
wherein each of the plurality of column circuits is configured to operate in a first mode and a second mode,
in the first mode, the column circuit receives as an input signal a single signal based on charges generated in the photoelectric converter of at least one pixel connected to the corresponding output line, amplifies the single signal at a common gain to generate a first pixel signal and a second pixel signal, and output a greater number of signals including the first pixel signal and the second pixel signal than the input signal, and
in the second mode, the column circuit receives as an input signal the single signal, amplifies the single signal at a first gain to generate a first pixel signal, amplifies the single signal at a second gain that is lower than the first gain to generate a second pixel signal, and outputs a greater number of signals including the first pixel signal and the second pixel signal than the input signal,
wherein each of the column circuits is further configured such that a signal based on a reset voltage of the pixel is amplified at the first gain to output a first reset signal and is amplified at the second gain to output a second reset signal, and
wherein the signal processing unit is configured to,
when each of the column circuits operates in the first mode, output a difference between the first pixel signal and the first reset signal as a first output signal and a difference between the second pixel signal and the first reset signal as a second output signal, and
when each of the column circuits operates in the second mode, output a difference between the first pixel signal and the first reset signal as a first output signal and output a second output signal obtained by multiplying a difference between the second pixel signal and the first reset signal by a ratio of the second gain to the first gain.

16. An imaging system comprising:
a solid-state imaging device including:
a pixel array unit in which a plurality of pixels each including a photoelectric converter are arranged over a plurality of rows and a plurality of columns,
a plurality of output lines each connected to the pixels arranged on a corresponding column of the plurality of columns, and a plurality of column circuits each connected to a corresponding output line of the plurality of output lines; and a signal processing unit that processes a signal output from the solid-state imaging device, wherein each of the plurality of column circuits is configured to operate in a first mode and a second mode, in the first mode, the column circuit receives as an input signal a single signal based on charges generated in the photoelectric converter of at least one pixel connected to the corresponding output line, amplifies the single signal at a common gain to generate a first pixel signal and a second pixel signal, and output a greater number of signals including the first pixel signal and the second pixel signal than the input signal, and in the second mode, the column circuit receives as an input signal the single signal, amplifies the single signal at a first gain to generate a first pixel signal, amplifies the single signal at a second gain that is lower than the first gain to generate a second pixel signal, and outputs a greater number of signals including the first pixel signal and the second pixel signal than the input signal, and wherein the signal processing unit is configured to, when each of the column circuits operates in the first mode, output a first output signal based on the first pixel signal and a second output signal based on the second pixel signal, and when each of the column circuits operates in the second mode, output a first output signal based on the first pixel signal and a second output signal obtained by multiplying a signal based on the second pixel signal by a ratio of the second gain to the first gain.

* * * * *